US012604105B2

(12) United States Patent
Totsuka

(10) Patent No.: US 12,604,105 B2
(45) Date of Patent: Apr. 14, 2026

(54) SIGNAL PROCESSING DEVICE AND METHOD, AND PROGRAM

(71) Applicant: Sony Semiconductor Solutions Corporation, Kanagawa (JP)

(72) Inventor: Atsushi Totsuka, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 224 days.

(21) Appl. No.: 18/555,597

(22) PCT Filed: Feb. 8, 2022

(86) PCT No.: PCT/JP2022/004809
§ 371 (c)(1),
(2) Date: Oct. 16, 2023

(87) PCT Pub. No.: WO2022/249562
PCT Pub. Date: Dec. 1, 2022

(65) Prior Publication Data
US 2024/0205551 A1 Jun. 20, 2024

(30) Foreign Application Priority Data

May 28, 2021 (JP) .................................. 2021-089860

(51) Int. Cl.
*H04N 23/88* (2023.01)
*H04N 23/10* (2023.01)

(52) U.S. Cl.
CPC ............. *H04N 23/88* (2023.01); *H04N 23/10* (2023.01)

(58) Field of Classification Search
CPC ..... H04N 23/88; H04N 1/6077; H04N 1/6086
(Continued)

(56) References Cited

U.S. PATENT DOCUMENTS

2014/0293091 A1* 10/2014 Rhoads ................ A61B 5/6898
348/234
2018/0013988 A1* 1/2018 Kondo ................. H04N 25/134
(Continued)

FOREIGN PATENT DOCUMENTS

JP H11175702 A 7/1999
JP 2013167624 A 8/2013
(Continued)

OTHER PUBLICATIONS

International Search Report (PCT/ISA/210), International Application No. PCT/JP2022/004809, dated May 10, 2022.

*Primary Examiner* — Anthony J Daniels
(74) *Attorney, Agent, or Firm* — Michael Best & Friedrich LLP

(57) ABSTRACT

The present technology relates to a signal processing device and method, and program capable of performing appropriate white balance adjustment without blocked-up shadows occurring.
A signal processing device includes: a detection unit that detects, based on a first polarization image of a plurality of polarization images with mutually different polarization directions, a specular reflection region in the polarization image, each of the polarization images being a captured image of a same subject; and a white reference acquisition unit that acquires, based on a result of detecting the specular reflection region, a white reference for balance adjustment from the specular reflection region of a second polarization image of the plurality of polarization images, the second polarization image having fewer specular reflection components than the first polarization image. The present technology can be applied in a signal processing device.

20 Claims, 14 Drawing Sheets

START WB ADJUSTMENT PROCESSING

ACQUIRE POLARIZATION IMAGE S11

DETECT SPECULAR REFLECTION REGION S12

EXTRACT LIGHT SOURCE COLOR REGION S13

ACQUIRE WHITE REFERENCE S14

CALCULATE WB GAIN S15

PERFORM WB ADJUSTMENT S16

END

(58) Field of Classification Search
USPC ...................................................... 348/223.1
See application file for complete search history.

(56)                        References Cited

U.S. PATENT DOCUMENTS

| | | | | |
|---|---|---|---|---|
| 2019/0166342 A1* | 5/2019 | Kondo | ....................... | G01J 4/04 |
| 2022/0003907 A1* | 1/2022 | Borremans | ............ | H04N 25/76 |
| 2024/0129642 A1* | 4/2024 | Ono | ....................... | H04N 23/88 |

FOREIGN PATENT DOCUMENTS

| | | | | |
|---|---|---|---|---|
| JP | 2015005927 A | * | 1/2015 |
| JP | 2016024482 A | | 2/2016 |
| WO | 2016136085 A1 | | 9/2016 |

* cited by examiner

SIGNAL PROCESSING DEVICE AND METHOD, AND PROGRAM

TECHNICAL FIELD

The present technology relates to a signal processing device and method, and program, and particularly to a signal processing device and method, and program capable of performing appropriate white balance adjustment without blocked-up shadows occurring.

BACKGROUND ART

Hitherto, various technologies have been proposed as technologies related to white balance adjustment (WB adjustment) to be performed when capturing an image.

For example, a technology has been proposed that makes it possible to appropriately correct color cast in an image by using as a white reference used for WB adjustment the pixel value of a pixel in a specular reflection region, that is, a region considered to be a mirror reflection region (for example, see PTL 1).

CITATION LIST

Patent Literature

[PTL 1]
JP 2016-24482A

SUMMARY

Technical Problem

However, with the above-mentioned technologies, it is difficult to perform appropriate WB adjustment without blocked-up shadows occurring.

For example, with the technology described in PTL 1, for a subject with a high gloss intensity, saturation of pixel values in a specular reflection region occurs, resulting in less effective pixels that can be used as white references, that is, less pixels whose pixel values are not saturated.

In addition, it is also possible to set exposure conditions such that saturation of pixel values does not occur when an image is captured. However, in such a case, there is a high possibility that blocked-up shadows will occur in a non-mirror reflection region, making it impossible to use the captured image as an image for the desired purpose such as inspection or to ignore any noise.

The present technology has been made in view of such circumstances to enable appropriate WB adjustment without blocked-up shadows occurring.

Solution to Problem

A signal processing device according to one aspect of the present technology includes: a detection unit that detects, based on a first polarization image of a plurality of polarization images with mutually different polarization directions, a specular reflection region in the polarization image, each of the polarization images being a captured image of a same subject; and a white reference acquisition unit that acquires, based on a result of detecting the specular reflection region, a white reference for balance adjustment from the specular reflection region of a second polarization image of the plurality of polarization images, the second polarization image having fewer specular reflection components than the first polarization image.

A signal processing method or a program according to one aspect of the present technology includes the steps of: detecting, based on a first polarization image of a plurality of polarization images with mutually different polarization directions, a specular reflection region in the polarization image, each of the polarization images being a captured image of a same subject; and acquiring, based on a result of detecting the specular reflection region, a white reference for balance adjustment from the specular reflection region of a second polarization image of the plurality of polarization images, the second polarization image having fewer specular reflection components than the first polarization image.

In one aspect of the present technology, based on a first polarization image of a plurality of polarization images with mutually different polarization directions, each of the polarization images being a captured image of a same subject, a specular reflection region in the polarization image is detected, and based on a result of detecting the specular reflection region, a white reference for balance adjustment is acquired from the specular reflection region of a second polarization image of the plurality of polarization images, the second polarization image having fewer specular reflection components than the first polarization image.

BRIEF DESCRIPTION OF DRAWINGS

FIG. 20 is a diagram showing a configuration example of a computer.

DESCRIPTION OF EMBODIMENTS

Embodiments to which the present technology is applied will be described below with reference to the accompanying drawings.

First Embodiment

<Configuration Example of Signal Processing Device>

The present technology acquires a plurality of polarization images with different polarization directions, and uses a polarization image different between detection of a specular reflection region (mirror reflection region) and acquisition of a white reference from the specular reflection region, so that appropriate WB adjustment can be performed without blocked-up shadows occurring.

For example, using of a polarization image having more specular reflection components makes it possible to detect a specular reflection region with higher accuracy.

In addition, acquiring a white reference by using a polarization image having fewer specular reflection components than the polarization image used to detect the specular reflection region makes it easy to obtain a sufficient number of effective pixels for acquiring the white reference such that appropriate WB adjustment can be performed. In other words, it is possible to prevent the pixel value of a pixel having a polarization component corresponding to the light source color used for WB adjustment from being saturated.

Moreover, this does not require to set exposure conditions that do not cause saturation of pixel values in the polarization image used for detecting the specular reflection region, so that it is possible to prevent blocked-up shadows and noise from occurring.

Figure 1:
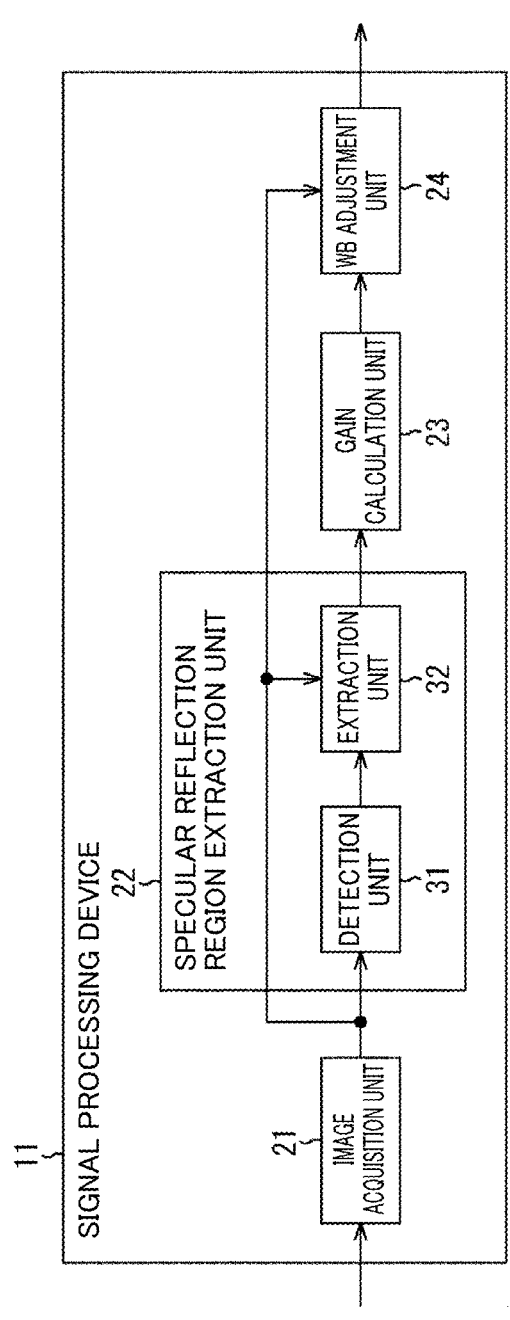
FIG. 1 is a diagram illustrating a configuration example of a signal processing device.

FIG. 1 is a diagram illustrating a configuration example of an embodiment of a signal processing device to which the present technology is applied.

The signal processing device 11 includes a device having a camera function, and the like, and is used for, for example, inspection such as color discrimination.

The signal processing device 11 includes an image acquisition unit 21, a specular reflection region extraction unit 22, a gain calculation unit 23, and a WB adjustment unit 24.

The image acquisition unit 21 includes, for example, an image sensor called a polarization sensor, and captures (acquires) a plurality of polarization images with mutually different polarization directions, and supplies the acquired polarization images to the specular reflection region extraction unit 22 and the WB adjustment unit 24.

The image acquisition unit 21 does not necessarily need to be provided in the signal processing device 11, and the signal processing device 11 may acquire a plurality of polarization images from an image acquisition unit 21 provided outside.

The specular reflection region extraction unit 22 extracts, based on at least two or more polarization images supplied from the image acquisition unit 21, a specular reflection region from which a white reference (white reference signal value) for WB adjustment (WB correction) is to be acquired, and supplies the result of extracting to the gain calculation unit 23. The specular reflection region extraction unit 22 includes a detection unit 31 and an extraction unit 32.

The detection unit 31 detects, based on at least one polarization image of the plurality of polarization images supplied from the image acquisition unit 21, a specular reflection region (mirror reflection region) in the polarization image, and supplies the result of detecting to the extraction unit 32.

The specular reflection region as used herein is a region having components of light that is specularly reflected (mirror reflected) on a subject in a polarization image, that is, a specular reflection component (mirror reflection component). In other words, the specular reflection region is a region of the subject portion where specular reflection occurs in the polarization image. This specular reflection component can be said to be a color component of the light source (light source color component).

The extraction unit 32 extracts, based on the result of detecting supplied from the detection unit 31 and the at least one polarization image of the plurality of polarization images supplied from the image acquisition unit 21, a specular reflection region from the polarization image, and supplies the result of extracting to the gain calculation unit 23.

The gain calculation unit 23 functions as a white reference acquisition unit that acquires a white reference from the specular reflection region extracted by the extraction unit 32 in the polarization image.

Specifically, the gain calculation unit 23 acquires a white reference based on the result of extracting supplied from the extraction unit 32, calculates a WB gain (white balance gain) for WB adjustment based on the white reference, and supplies the WB gain to the WB adjustment unit 24. For example, the gain calculation unit 23 acquires an average value of the pixel values of the pixels in the extracted specular reflection region as the white reference.

The WB adjustment unit 24 performs WB adjustment on the polarization image supplied from the image acquisition unit 21, based on the WB gain supplied from the gain calculation unit 23, and outputs to a subsequent stage the polarization image on which the WB adjustment has been performed.

<Polarization Image>

Next, a polarization image acquired by the image acquisition unit 21 will be described.

Figure 2:
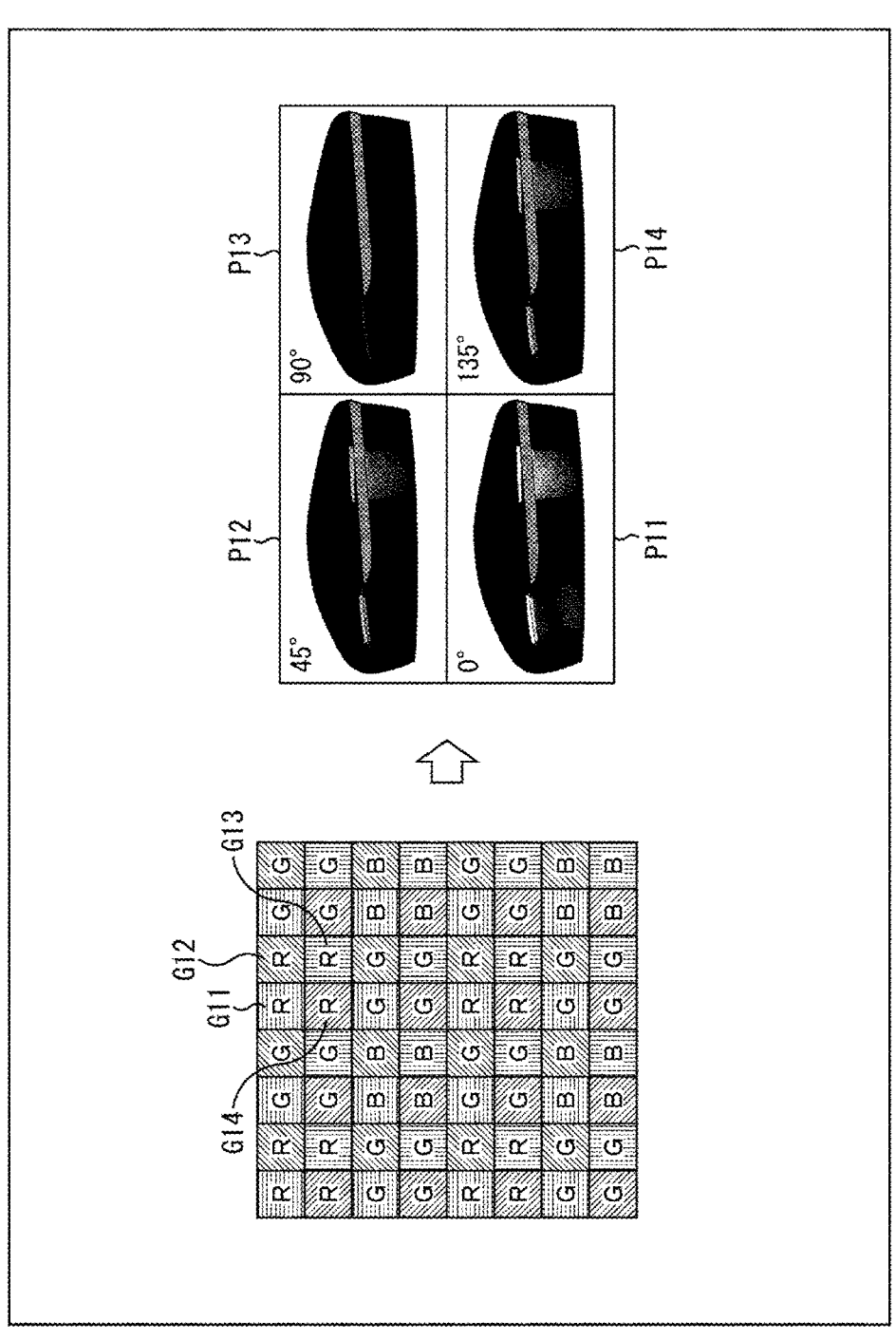
FIG. 2 illustrates polarization image capturing.

As illustrated in FIG. 2, for example, the image sensor serving as the image acquisition unit 21 includes a plurality of polarization pixels that receive light (polarization components) in mutually different polarization directions, in other words, a plurality of polarization pixels with mutually different directions of transmission axes (polarization directions).

In the left part of FIG. 2, for example, each square represents one polarization pixel, and each polarization pixel receives light (polarization component) in a polarization direction corresponding to the direction of its own transmission axis, and performs photoelectric conversion on the light.

The direction of a hatch (diagonal lines) drawn inside each polarization pixel (square) represents the polarization direction of the light received by that polarization pixel, that is, the polarization angle. In particular, in the figure, the left-right direction is a direction with a polarization angle of "0 degrees".

Therefore, for example, a polarization pixel G11 is a pixel that receives a polarization component with a polarization angle of 0 degrees, that is, a polarization pixel with a polarization angle of 0 degrees, and a polarization pixel G12 is a pixel that receives a polarization component with a polarization angle of 45 degrees. Further, for example, a polarization pixel G13 is a pixel that receives a polarization component with a polarization angle of 90 degrees, and a polarization pixel G14 is a pixel that receives a polarization component with a polarization angle of 135 degrees.

The polarization pixel G12 and the polarization pixel G14 are each a pixel with the polarization direction shifted by 45 degrees from the polarization pixel G11, and the polarization pixel G13 is a pixel with the polarization direction shifted by 90 degrees from the polarization pixel G11.

In the image acquisition unit 21, each polarization pixel with a polarization angle of 0 degrees receives incident light and performs photoelectric conversion on the received light, so that one polarization image P11 is acquired. In other words, a polarization image P11 is captured by a plurality of polarization pixels with a polarization angle of 0 degrees.

Similarly, in the image acquisition unit 21, a polarization image P12 is captured by a plurality of polarization pixels with a polarization angle of 45 degrees, a polarization image P13 is captured by a plurality of polarization pixels with a polarization angle of 90 degrees, and a polarization image P14 is captured by a plurality of polarization pixels with a polarization angle of 135 degrees.

Thus, the image acquisition unit 21 acquires the plurality of polarization images P11 to P14 with mutually different polarization components by capturing images of the same subject at the same time or almost at the same time.

These polarization images P11 to P14 are basically images of the same subject in the same positional relationship. However, among the polarization images, the pixel value of a pixel at a same pixel position, that is, the brightness of the subject appearing may be different.

For example, in this example, since the polarization angle (polarization direction) of the light from the light source is 0 degrees, the polarization image P11 is an image having the most specular reflection components and a large (wide) specular reflection region (mirror reflection region). Here, a white region in each polarization image is a specular reflection region.

In contrast, the polarization image P13, which has a polarization angle different from that of the polarization image P11 by 90 degrees, has few specular reflection components, in other words, it is an image having few specular reflection regions. The polarization image P12 and the polarization image P14 have more specular reflection components than the polarization image P13, and have fewer specular reflection components than the polarization image P11.

In more detail, each polarization pixel provided in the image acquisition unit 21 is provided with a color filter that transmits only one of the color components of Red (R), green (G), or blue (B).

In FIG. 2, letters "R", "G", and "B" marking the polarization pixels indicate the colors (color components to be transmitted) of the color filters provided in the polarization pixels. Therefore, for example, the polarization pixel G11 marked with the letter "R" receives only the R component light with a polarization angle of 0 degrees.

In particular, in this example, color filters of the same color are provided for adjacent polarization pixels with polarization directions of 0 degrees, 45 degrees, 90 degrees, and 135 degrees, respectively, so that the polarization images P11 to P14 can be obtained as color images in which the subject appears in the same positional relationship.

In the following, an example will be described in which polarization pixels with polarization directions of 0 degrees, 45 degrees, 90 degrees, and 135 degrees are provided in the image acquisition unit 21, as illustrated in FIG. 2. However, the image acquisition unit 21 is not limited to this example, and may be provided with at least two or more polarization pixels with mutually different polarization directions, and each polarization direction may be any direction.

The polarization pixels with the respective polarization directions and the characteristics of a polarization image will now be further described with reference to FIGS. 3 and 4. In FIG. 4, parts corresponding to those in FIG. 2 are denoted by the same reference numerals and signs, and description thereof will be appropriately omitted.

First, the relationship between two reflected light rays (dichroic reflection model) and their polarization directions will be described with reference to FIG. 3. In other words, the polarization characteristics of a specular reflection component and a diffuse reflection component will be described.

Figure 3:
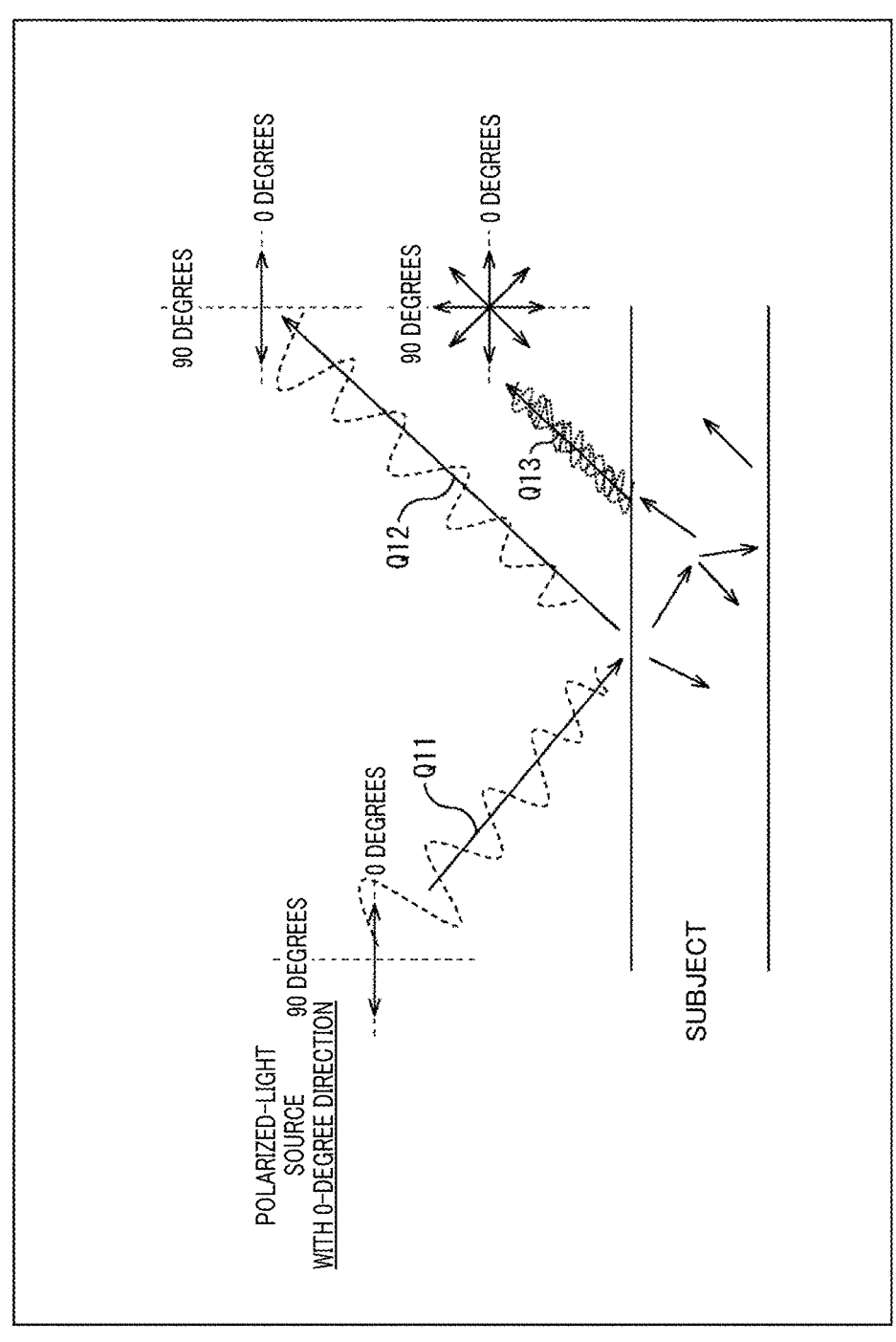
FIG. 3 illustrates polarization characteristics of a specular reflection component and a diffuse reflection component.
Figure 4:
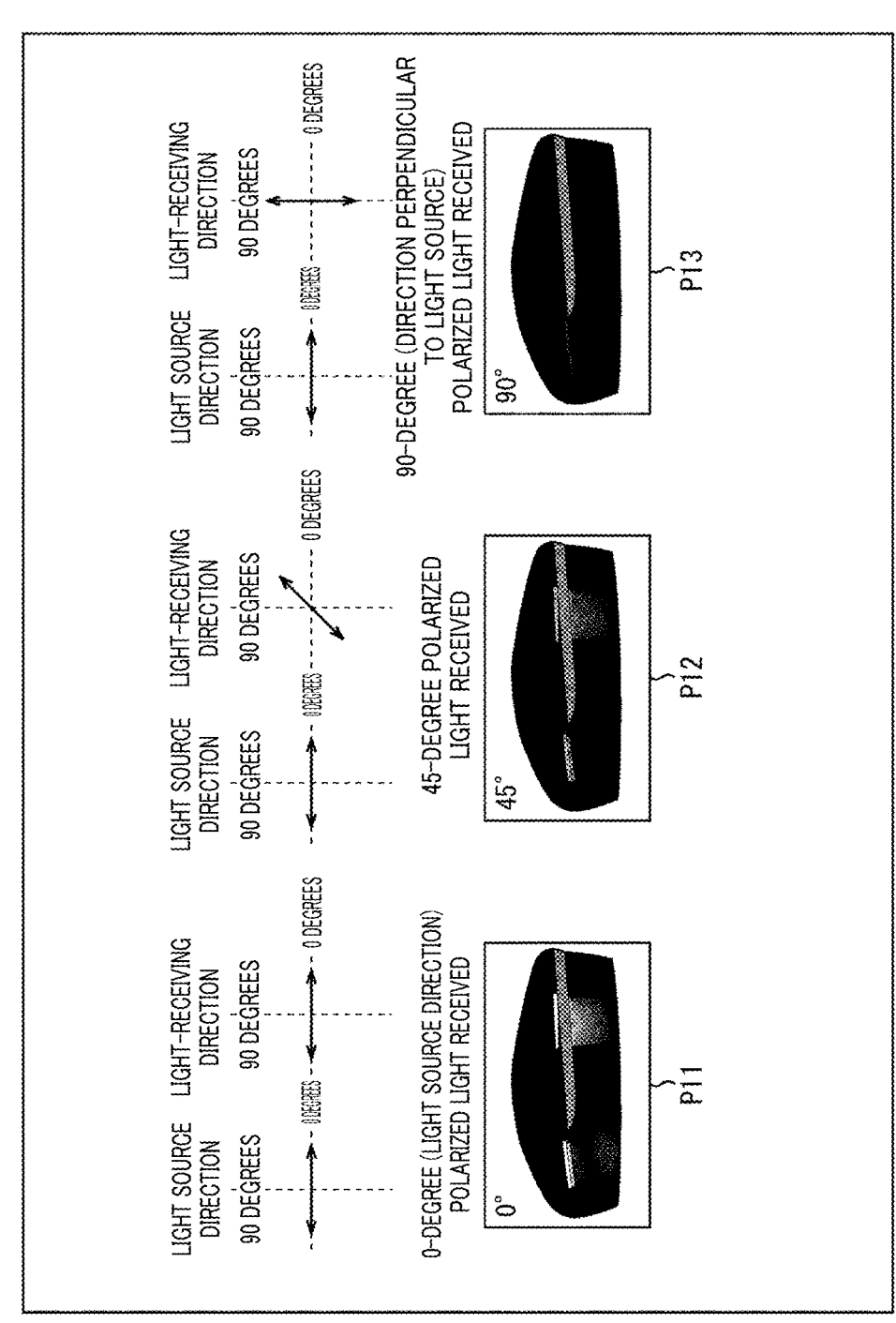
FIG. 4 illustrates polarization images.

As illustrated in FIG. 3, for example, given is a polarized-light source that outputs light with a polarization angle of 0 degrees (light in 0-degree direction), and a subject is illuminated with light output from the polarized-light source is illuminated, as indicated by an arrow Q11.

In this case, part of the light output from the polarized-light source is specularly reflected (mirror-reflected) on the surface of the predetermined subject, and then enters the light receiving surface of the image acquisition unit 21 as a specular reflection component (mirror reflection component), as indicated by an arrow Q12.

This specular reflection component is a light component (light source color component) output by the polarized light source. Accordingly, the specular reflection retains the 0-degree direction (a polarization angle of 0 degrees), which is the polarization direction of the light from the polarized-light source (light source polarization direction), as it is.

The remaining part of the light output from the polarized-light source is diffusely reflected inside the subject and so on, and then enters the light receiving surface of the image acquisition unit 21 as a diffuse reflection component, as indicated by an arrow Q13.

Inside the subject and so on, the polarization direction of the light from the polarized-light source changes in various directions due to diffuse reflection, that is, internal scattering and secondary reflection. Therefore, the diffuse reflection component indicated by the arrow Q13 is unpolarized light (non-polarization component) having components in various polarization directions.

When the image acquisition unit 21 captures an image while the subject is illuminated with the light from the polarized-light source illustrated in FIG. 3, the polarization images P11 to P14 illustrated in FIG. 2, for example, are obtained.

Here, the polarization direction of the light output from the polarized light source is referred to as the light source direction, and a polarization direction in which the polarization pixels of the image acquisition unit 21 receive the light is referred to as the light-receiving direction. The relationships between the light source direction, the light-receiving directions, and the polarization images are as illustrated in FIG. 4.

Specifically, as illustrated on the left side of FIG. 4, the polarization image P11 is an image captured by polarization pixels with a light-receiving direction that is the same as the light source direction, and the polarization image P11, more specifically, the image signal of the polarization image P11 has polarization components in the light source direction.

In particular, the polarization image P11 has the specular reflection components (mirror reflection components) and some of the diffuse reflection components, which come from the subject. Hereinafter, a polarization image captured by polarization pixels with a light-receiving direction that is the same as the light source direction, that is, a polarization image in which there is no shift between the light-receiving direction and the light source direction (i.e., 0 degrees), is also referred to as a 0-degree polarization image.

As illustrated in the center of FIG. 4, the polarization image P12 is an image captured by polarization pixels with the light-receiving direction shifted by 45 degrees from the light source direction, and the polarization image P12 has polarization components in a 45-degree direction (with a polarization angle of 45 degrees).

In particular, the polarization image P12 has some of the specular reflection components and some of the diffuse reflection components, which come from the subject. Hereinafter, a polarization image captured by polarization pixels with a light-receiving direction shifted by 45 degrees from the light source direction, that is, a polarization image in which there is a shift of 45 degrees between the light-receiving direction and the light source direction is also be referred to as a 45-degree polarization image.

As illustrated in the right side of FIG. 4, the polarization image P13 is an image captured by polarization pixels with the light-receiving direction shifted by 90 degrees from the light source direction, and the polarization image P13 has polarization components in a 90-degree direction (with a polarization angle of 90 degrees).

In particular, the polarization image P13 has some of the diffuse reflection components, which comes from the subject, and few specular reflection components. Hereinafter, a polarization image captured by polarization pixels with a light-receiving direction shifted by 90 degrees from the light source direction, that is, a polarization image in which there is a shift of 90 degrees between the light-receiving direction and the light source direction is also be referred to as a 90-degree polarization image.

From the above, the 0-degree polarization image is an image having the most specular reflection components among the polarization images, and the 90-degree polarization image is an image having the least specular reflection components among the polarization images. The 45 degree polarization image is a polarization image having fewer specular reflection components than the 0-degree polarization image but more specular reflection components than the 90-degree polarization image.

In general, Malus law is known in which when the difference between the light source direction and the light-receiving direction is an angle $\theta$, the more the angle $\theta$ is shifted from 0 degrees (the farther it is) along a curve of $\cos^2 \theta$, the more the specular reflection components included in the polarization image are reduced.

Therefore, in this example, among the polarization images P11 to P14, the polarization image P11 with a light-receiving direction that is the same as the light source direction has the most specular reflection components. In other words, the polarization image P11 is a 0-degree polarization image.

Here, since the light source direction (light source polarization direction) is the 0-degree direction, the polarization image P11 is a 0-degree polarization image. However, when the light source direction is the 45-degree direction, for example, the polarization image P12 has the most specular reflection components. Thus, the polarization image P12 is a 0-degree polarization image.

The polarization images P11 to P14 also have diffuse reflection components. However, since the diffuse reflection components coming from the subject are non-polarized, the diffuse reflection components included in these polarization images are approximately constant regardless of the polarization direction of the pixels.

In the signal processing device 11, a white reference is acquired using a plurality of polarization images with mutually different polarization directions as described above.

In particular, in the signal processing device 11, a different polarization image is used for each of the detection of a specular reflection region in a polarization image and the extraction of the specular reflection region from the polarization image, in other words, the acquisition of a white reference from the polarization image. Specifically, at least a 0-degree polarization image is used for the detection of a specular reflection region, and at least a 45 degree polarization image is used for the acquisition of a white reference.

For example, by calculating a difference between a 90-degree polarization image and another polarization image, a specular reflection region, that is, a region of light source color component can be extracted.

In this case, for example, if a 0-degree polarization image is used, that is, if a difference image between the 0-degree polarization image and the 90-degree polarization image is used, a specular reflection region can be easily detected. This is because the 0-degree polarization image has specular reflection components (light source color components) not reduced. For example, in a polarization image, a region where a light source such as a lighting fixture is reflected is detected as a specular reflection region.

However, in a 0-degree polarization image, since there is no reduced specular reflection components, saturation of pixel values of pixels is likely to occur in the specular reflection region.

For example, if a 45-degree polarization image is used, that is, if a difference image between the 45-degree polarization image and the 90-degree polarization image is used, a specular reflection region can be detected. However, in the 45-degree polarization image, since the specular reflection components (light source color components) are reduced, a specular reflection region may not be detected as accurately as when the 0-degree polarization image is used.

On the other hand, since the 45-degree polarization image has reduced specular reflection components, saturation of pixel values of pixels in the specular reflection regions of the 45-degree polarization image is less likely to occur, which is more suitable for acquiring a white reference than the 0-degree polarization image.

Therefore, in the present technology, a 0-degree polarization image is used for the detection of a specular reflection region, and a 45-degree polarization image is used for the acquisition of a white reference. This makes it possible to detect a specular reflection region with high accuracy, easily secure a sufficient number of pixels that are effective for the acquisition of the white reference (effective pixels), and perform appropriate WB adjustment without blocked-up shadows and noise occurring.

<Explanation of WB Adjustment Processing>

Next, operations of the signal processing device 11 will be described. Specifically, WB adjustment processing performed by the signal processing device 11 will be described below with reference to a flowchart in FIG. 5.

In step S11, the image acquisition unit 21 captures (acquires) a plurality of polarization images with mutually different polarization directions by receiving the incident light and performing photoelectric conversion on the received light, and supplies the acquired polarization images to the detection unit 31, the extraction unit 32, and the WB adjustment unit 24.

The image acquisition unit 21 performs the image capture processing to acquire, the polarization images P11 to P14 illustrated in FIG. 2, for example.

Figure 6:
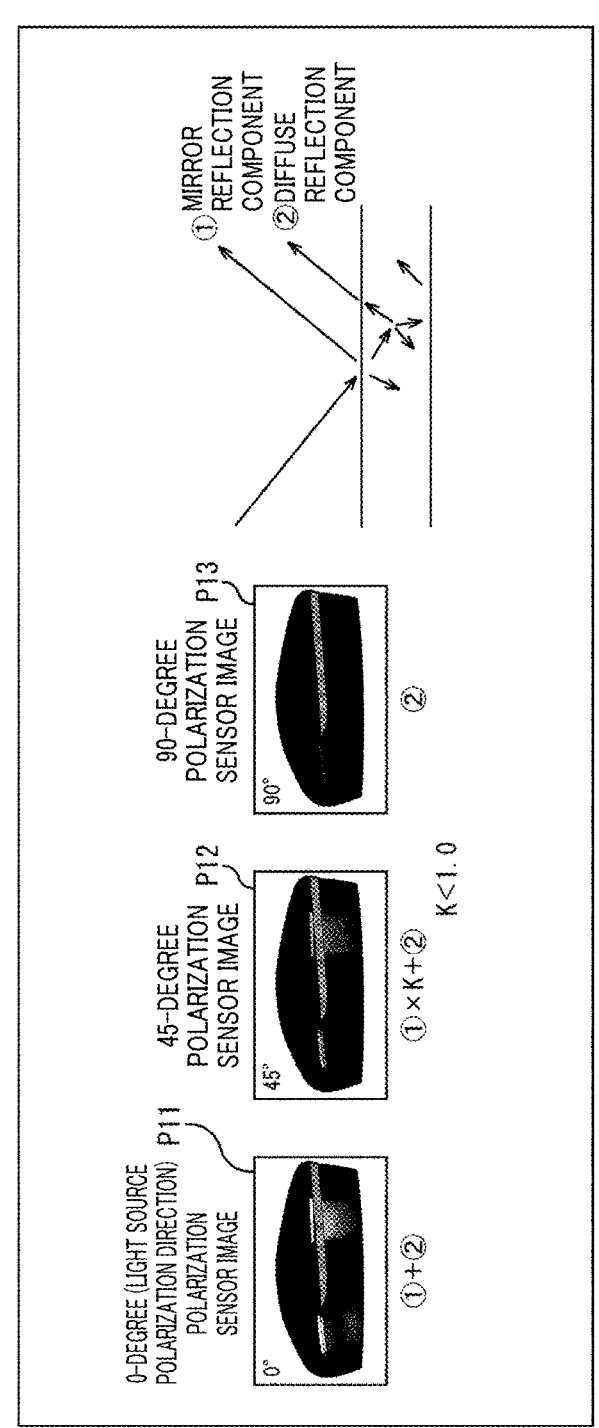
FIG. 6 illustrates polarization images.

In this processing, as illustrated on the right side of FIG. 6, for example, the components of the light that enters the image acquisition unit 21 from the polarized-light source include a specular reflection component (mirror reflection component) due to specular reflection on the subject and a diffuse reflection component due to diffuse reflection on the subject.

Therefore, when the polarization image P11 is a 0-degree polarization image, the polarization image P11 has specular reflection components and diffuse reflection components, as illustrated on the left side in FIG. 6.

Here, the case where the polarization image P11 is a 0-degree polarization image is a case where the polarization direction of the polarization image P11, that is, the polarization direction of the light received by the polarization pixels G11 (the polarization direction of the polarization pixels G11), and the polarization direction of the light output from the polarized-light source are the same, as described above.

When the polarization image P11 is a 0-degree polarization image, the polarization image P12 is a 45-degree polarization image, and the polarization image P13 is a 90-degree polarization image, as illustrated on the left side of FIG. 6.

Thus, when a predetermined coefficient less than 1.0 is k (k<1.0), the polarization image P12 has specular reflection components that are k times the specular reflection components included in the polarization image P11, and diffuse reflection components, and the polarization image P13 basically has no specular reflection components but has only diffuse reflection components.

If the correspondence between the polarization direction of the polarized-light source and the polarization direction of each polarization image is known, the specular reflection region extraction unit 22 can identify which polarization image is a 0-degree polarization image.

The polarization direction of the polarized-light source may be inputted by an input operation of the user and the like, and the specular reflection region extraction unit 22 may identify a 0-degree polarization image based on the input of the user. Alternatively, the user may perform an input operation to directly specify a 0-degree polarization image.

As another case, if there is no input operation of the user or the like and the correspondence between the polarization direction of the polarized-light source and the polarization direction of each polarization image is not known, the specular reflection region extraction unit 22 may identify a 0-degree polarization based on a plurality of polarization images.

In such a case, for example, the specular reflection region extraction unit 22 calculates a contrast for each polarization image based on the polarization image, determines the polarization image with the highest contrast to be a 0-degree polarization image, and determines the polarization image with the lowest contrast to be a 90-degree polarization image. This is because the 0-degree polarization image has the most specular reflection components and therefore has the highest contrast.

Similarly, for example, the specular reflection region extraction unit 22 may calculate for each polarization image the number of pixels (pixel number) whose pixel values are equal to or higher than a predetermined threshold, determine the polarization image with the largest number of pixels to be a 0-degree polarization image, and determine the polarization image with the smallest number of pixels to be a 90-degree polarization image.

Figure 5:
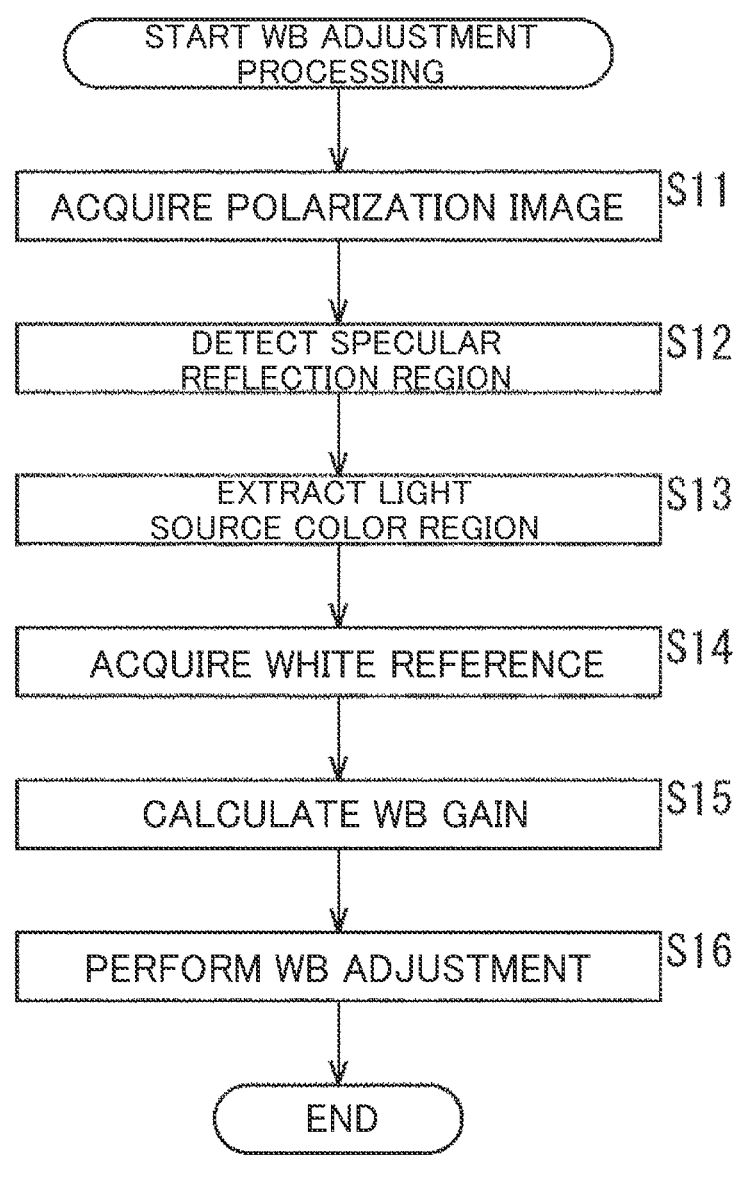
FIG. 5 is a flowchart diagram illustrating WB adjustment processing.

Returning to the explanation of the flowchart in FIG. 5, in step S12, the detection unit 31 detects, based on at least one 0 degree polarization image of the plurality of polarization images supplied from the image acquisition unit 21, a specular reflection region in the polarization image, and supplies the result of detecting to the extraction unit 32.

Figure 7:
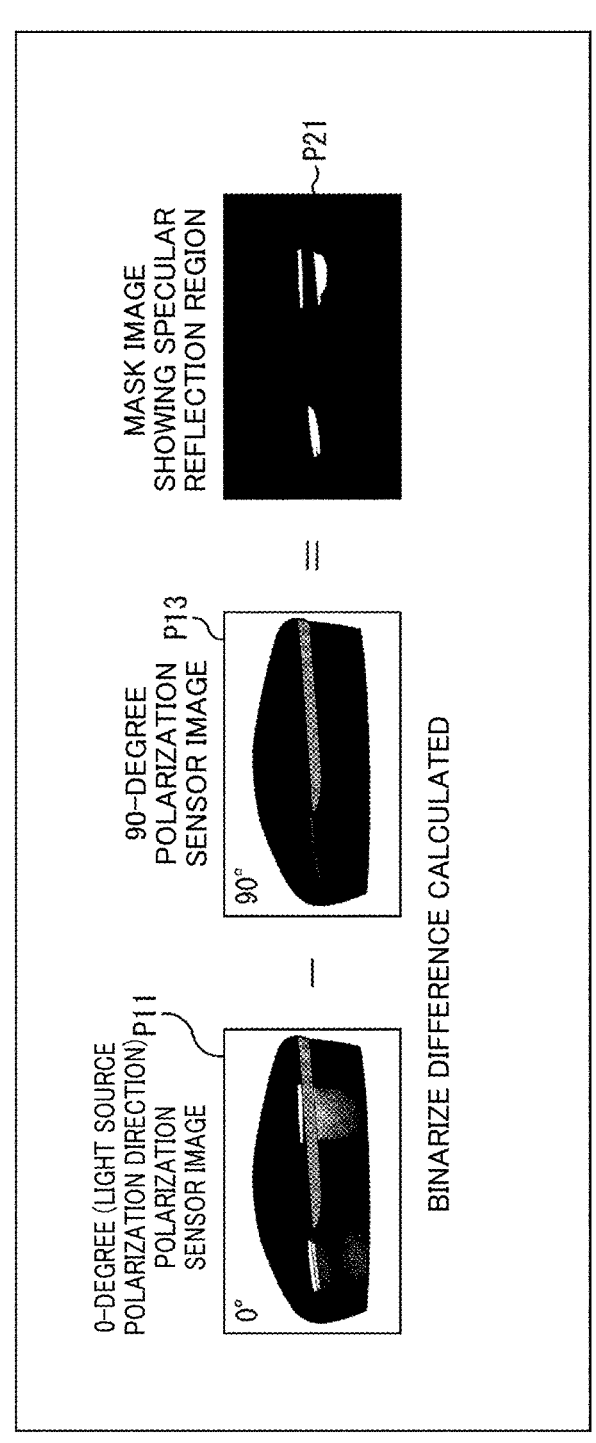
FIG. 7 illustrates generation of a mask image.

It is assumed that the polarization image P11 and the polarization image P13, illustrated in FIG. 6, for example, are acquired. In such a case, as illustrated in FIG. 7, for example, the detection unit 31 calculates, for each pixel in the same positional relationship, a difference between the polarization image P11, which is a 0-degree polarization image, and the polarization image P13, which is a 90-degree polarization image, and binarizes the difference to obtain a mask image P21.

In other words, for example, the detection unit 31 generates a difference image by calculating a difference between the polarization image P11 and the polarization image P13. In this case, in the difference image, the pixel values of pixels in a region having more specular reflection components is larger, and the pixel values of pixels in a region having fewer specular reflection components is smaller.

Therefore, the detection unit 31 generates the mask image P21 in which for a pixel whose pixel value is equal to or greater than a predetermined threshold in the difference image, the pixel value of the pixel in the mask image P21 having the same positional relationship as that pixel is set to "1", and for a pixel whose pixel value is less than the predetermined threshold in the difference image, the pixel value of the pixel in the mask image P21 having the same positional relationship as that pixel is set to "0". In other words, the detection unit 31 generates the mask image P21 by binarizing the difference image using the threshold.

In the mask image P21 thus obtained, a region consisting of pixels whose pixel values are "1" is a specular reflection region. The detection unit 31 supplies the mask image P21 to the extraction unit 32 as a result of detecting a specular reflection region.

If the correspondence between the polarization direction of the polarized-light source and the polarization direction of each polarization image is not known, the processing of step S12 may be performed after identifying a 0-degree polarization image as described above, or a difference image may be generated using different combinations of images.

In the latter case, the detection unit 31 generates, for each combination of any two of the polarization images, a difference image that is the difference between the two polarization images, and generates a mask image by binarizing the difference image with the highest contrast among the resulting difference images.

For example, when a subject has high specularity, a significant brightness difference occurs between a specular reflection region and a non-specular reflection region (a region other than the specular reflection region) in a 0-degree polarization image.

Therefore, in such a case, a specular reflection region may be detected based only on a 0-degree polarization image without using a 90-degree polarization image. Specifically, for example, the detection unit 31 detects a specular reflection region from the 0-degree polarization image based on an Otsu threshold or the like, and supplies a mask image or the like indicating the result of detecting to the extraction unit 32.

As another case, for example, when there is no or small specular reflection region in each polarization image, that is, when the difference in pixel values in the specular reflection region is small between the 0-degree polarization image and the 90-degree polarization image, the signal processing device 11 may display an error message or the like to the user.

In such a case, for example, the signal processing device 11 controls a display unit to present a display to prompt the user to manually specify a specular reflection region, specify another method for calculating a white reference, and the like, and performs subsequent processing in response to the specification by the user. For example, as an example of another method for calculating a white reference, there may be a method in which a white reference is acquired from the entire polarization image and a WB gain is calculated.

Returning to the explanation of the flowchart in FIG. 5, after the processing of step S12 is performed, the processing of step S13 is performed.

In step S13, the extraction unit 32 extracts, based on the result of detecting supplied from the detection unit 31 and the at least one polarization image of the plurality of polarization images supplied from the image acquisition unit 21, a region of the light source color, that is, a specular reflection region from the polarization image, and supplies the result of extracting to the gain calculation unit 23.

Figure 8:
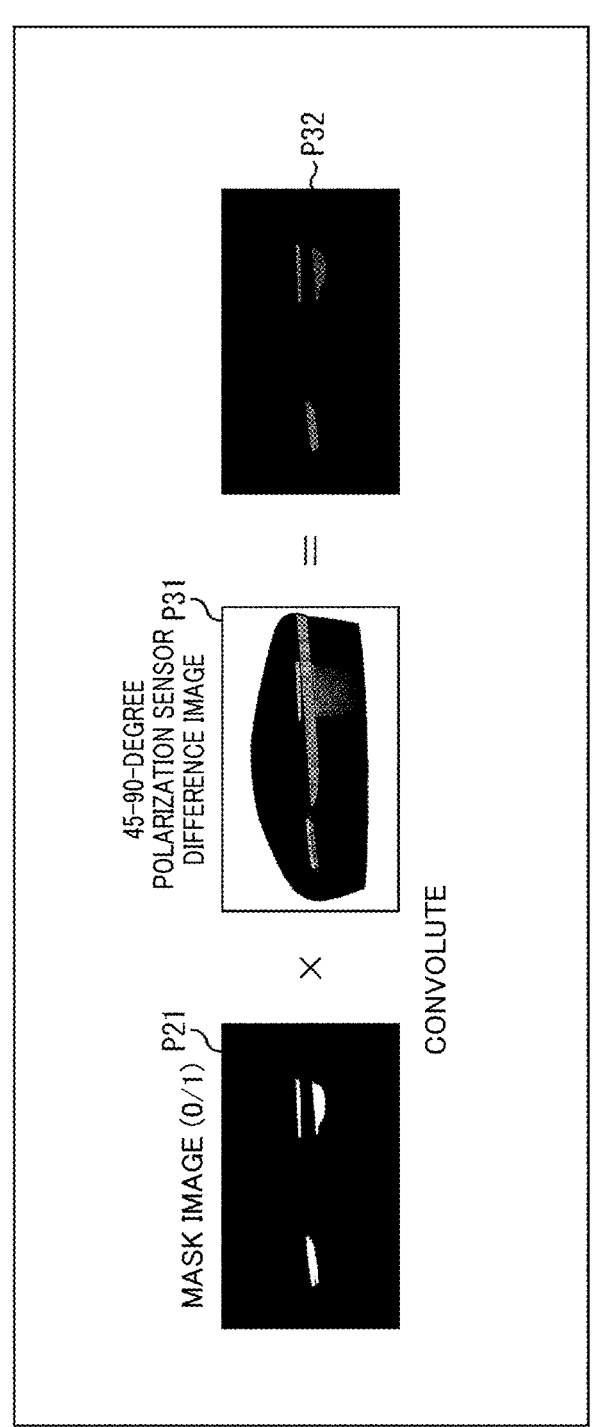
FIG. 8 illustrates acquisition of a white reference.

For example, it is assumed that the mask image P21 illustrated in FIG. 7 is acquired as the result of detecting a specular reflection region. In such a case, the extraction unit 32 generates a difference image P31 by calculating a difference between the 45-degree polarization image and the 90-degree polarization image, as illustrated in FIG. 8, for example.

Then, the extraction unit 32 generates a specular reflection region image P32 for acquiring a white reference by convolving the mask image P21 and the difference image P31, and supplies the resulting specular reflection region image P32 to the gain calculation unit 23 as the result of extracting the specular reflection region.

For example, when a certain pixel in the specular reflection region image P32 is a pixel of interest, the pixel value of that pixel of interest is a value obtained by multiplying the pixel value of the pixel of the mask image P21 that is in the same positional relationship as the pixel of interest by the pixel value of the pixel of the difference image P31 that is in the same positional relationship as the pixel of interest.

The specular reflection region image P32 thus obtained is an image in which the pixel value of each pixel in the regions other than the specular reflection regions, that is, in the non-specular reflection regions is "0", while the pixel value of each pixel in the specular reflection regions is a value larger than 0, that is, an image consisting only of specular reflection regions. Therefore, the specular reflection region image P32 can be said to be the result of extracting the specular reflection region from the 45-degree polarization image based on the mask image P21, which is the result of detecting the specular reflection region.

The extraction unit 32 extracts a specular reflection region (generates a specular reflection region image) by using a 45 degree polarization image with fewer specular reflection components than that used for detecting a specular reflection region. Therefore, saturation of pixel values of pixels corresponding to the light source color used for calculating a WB gain, for which a white reference is to be acquired, can be prevented, and a sufficient number of effective pixels can be secured.

In a 45-degree polarization image, when the contrast between the specular reflection region (mirror reflection region) and the non-specular reflection region is high, the contribution rate of the diffuse reflection component in the specular reflection region can be considered to be extremely small. In such a case, the extraction unit 32 may detect a specular reflection region based only on a 45-degree polarization image without using a 90-degree polarization image. Specifically, the mask image P21 and the polarization image P12, which is a 45-degree polarization image, may be convoluted to generate the specular reflection region image P32.

For example, when the detection unit 31 uses only a 0-degree polarization image to detect a specular reflection region, and the extraction unit 32 uses only a 45-degree polarization image to generate a specular reflection region image, the image acquisition unit 21 can acquire at least the 0-degree polarization image and the 45-degree polarization image.

When the saturation in a polarized-light source, that is, in the specular reflection region is high, glossy coloring or false detection may occur. In such cases, the result of extracting the specular reflection region may not be used to acquire a white reference as it is.

Specifically, for example, the gain calculation unit 23 may acquire a white reference only from regions in which saturation is not high among the specular reflection regions, or may calculate a WB gain by way of other methods such as acquiring a white reference from the entire polarization image.

Returning to the explanation of the flowchart of FIG. 5, in step S14, the gain calculation unit 23 acquires a white reference based on the result of extracting the specular reflection region supplied from the extraction unit 32, that is, based on the specular reflection region image.

Specifically, the gain calculation unit 23 calculates as the white reference the average value of the pixel values of pixels whose pixel values are greater than 0 in the specular reflection region image (hereinafter also referred to as the pixel average value) for each of the R, G, and B color components.

Therefore, for example, the white reference for the R component is obtained by identifying R component pixels whose pixel values are not 0 in the specular reflection region image, and dividing the integral value (sum) of the pixel values of all the identified pixels by the number of the identified pixels. Therefore, it can be said that the white reference for the R component is the average value of the pixel values of the R component pixels in the specular reflection region.

Although it has been described that pixels whose pixel values are greater than 0 in the specular reflection region image are used to acquire a white reference, pixels whose pixel values are greater than 0 and in which saturation (blown-out highlights) does not occur may be set as effective pixels, and only the effective pixels may be used to obtain the white reference. Here, a pixel in which saturation occurs, that is, a pixel whose pixel value is saturated, refers to, for example, a pixel whose pixel value is a possible maximum of pixel values.

For few effective pixels that are available to calculate a white reference in a 45-degree polarization image, for example, switching to another method for acquiring a white reference, displaying a warning to the user, and/or feedback to a control unit or the like that controls the image acquisition unit 21 may be performed.

Here, the other method for acquiring a white reference refers to, for example, a method for acquiring a white reference for the entire 45-degree polarization image, that is, a method of calculating the pixel average value for each color component by using all pixels of the 45-degree polarization image and setting the resulting pixel average value to a white reference.

As displaying a warning to the user, for example, a display may be presented that prompts the user to manually change the exposure settings (settings for exposure) to obtain an appropriate exposure time that does not cause blown-out highlights or blocked-up shadows.

For example, when the control unit that controls the image acquisition unit 21 receives feedback from the gain calculation unit 23 that there are few effective pixels in the 45-degree polarization image, the control unit makes auto exposure (AE) settings (automatic exposure settings) for the next frame according to the feedback.

Specifically, for example, the control unit adjusts the automatic exposure settings for the next frame so that more effective pixels can be obtained, such as by narrowing down the aperture of the imaging lens or shortening the exposure time for a polarization image. The control unit then controls the capturing of the polarization images in the next frame by the image acquisition unit 21 and the like according to the adjusted automatic exposure settings.

Even when many blocked-up shadows occur in a 90-degree polarization image, displaying a warning to the user and/or feedback for automatic exposure settings to the control unit or the like may be performed in the same way as for few effective pixels.

In step S15, the gain calculation unit 23 calculates a WB gain based on the white reference acquired in step S14, and supplies the WB gain to the WB adjustment unit 24.

For example, the WB gain is calculated for each of the R, G, and B color components by calculating the reciprocal of the ratio of the white reference of each color component to the white reference of the G component.

Specifically, the gain calculation unit 23 calculates a WB gain for the R component by dividing the white reference of the G component (pixel average value of the G component) by the white reference of the R component, and calculates a WB gain for the B component by dividing the white reference of the G component by the white reference of the B component. The WB gain for the G component is set to "1".

In step S16, the WB adjustment unit 24 performs WB adjustment on the polarization image supplied from the image acquisition unit 21, based on the WB gains supplied from the gain calculation unit 23, and outputs to a subsequent stage the polarization image on which the WB adjustment has been performed.

For example, the WB adjustment unit 24 performs WB adjustment (WB correction) by multiplying the polarization image to be subjected to the WB adjustment by the WB gain. In this WB adjustment, the pixel value of an R component pixel in the polarization image is multiplied by the WB gain for the R component, the pixel value of a B component pixel is multiplied by the WB gain for the B component, and the pixel value of a G component pixel is multiplied by the WB gain for the G component.

The polarization image to be subjected to the WB adjustment may be each of one or more polarization images captured by the image acquisition unit 21, such as a 45 degree polarization image, or may be a single image obtained by combining a plurality of polarization images.

When the WB adjustment is performed, the WB adjustment unit 24 outputs to a subsequent stage the polarization image on which the WB adjustment has been performed, and then the WB adjustment processing ends.

As described above, the signal processing device 11 detects a specular reflection region by using a 0-degree polarization image, extracts the specular reflection region by using the result of detecting and a 45-degree polarization image, which has fewer specular reflection components than the 0-degree polarization image, and acquires a white reference.

This processing makes it possible to detect a specular reflection region with high accuracy, easily secure a sufficient number of pixels that are effective for the acquisition of the white reference (effective pixels), and perform appropriate WB adjustment without blocked-up shadows and noise occurring.

Application Example of Present Technology

The present technology described above can be applied to, for example, a signal processing device having a camera function that performs an inspection regarding color or the like.

Figure 9:
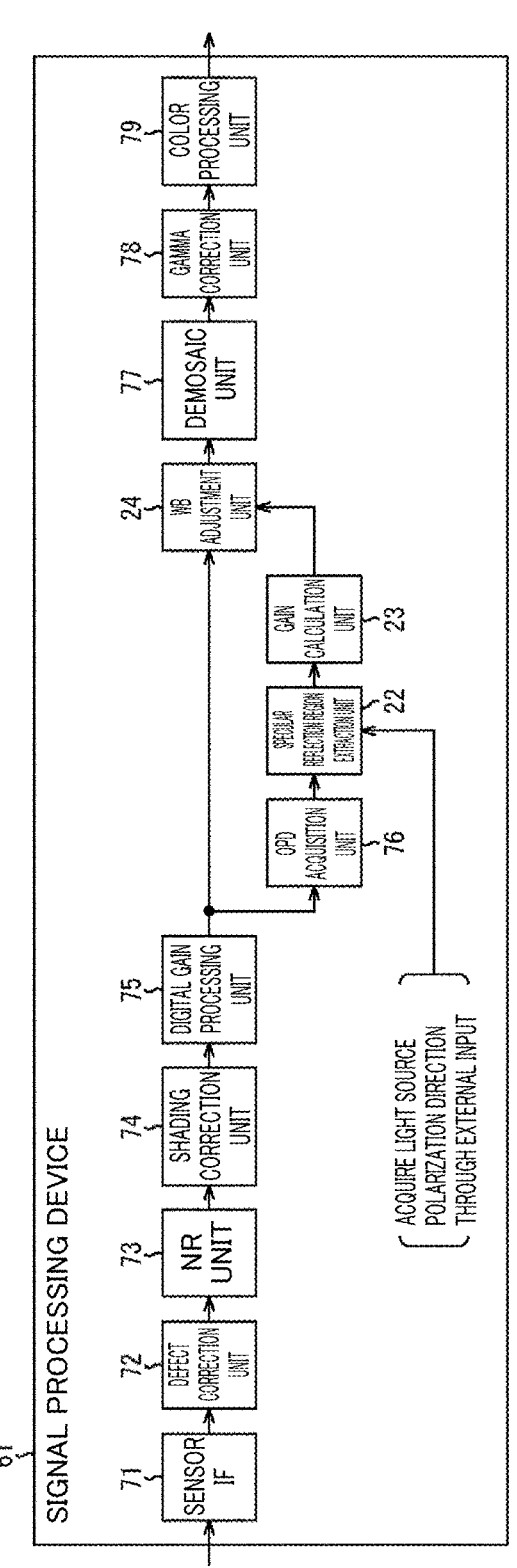
FIG. 9 is a diagram illustrating an application example of the present technology.

FIG. 9 is a diagram illustrating a specific configuration example of a signal processing device, having a camera function, to which the present technology is applied. In FIG. 9, parts corresponding to those in FIG. 1 are denoted by the same reference numerals and signs, and description thereof will be omitted accordingly.

The signal processing device 61 illustrated in FIG. 9 includes a sensor interface (IF) 71, a defect correction unit 72, a noise reduction (NR) unit 73, a shading correction unit 74, a digital gain processing unit 75, an optical detector (OPD) acquisition unit 76, the specular reflection region extraction unit 22, the gain calculation unit 23, the WB adjustment unit 24, a demosaic unit 77, a gamma correction unit 78, and a color processing unit 79.

The sensor IF 71 is an interface connected to the image acquisition unit 21, acquires polarization images with a plurality of different polarization directions from the image acquisition unit 21, and supplies them to the defect correction unit 72.

The defect correction unit 72 performs defect correction on the polarization images supplied from the sensor IF 71, and supplies to the NR unit 73 the polarization images on which the defect correction has been performed. The NR unit 73 performs noise removal processing on the polarization images supplied from the defect correction unit 72, and supplies the resulting polarization images to the shading correction unit 74.

The shading correction unit 74 performs shading correction on the polarization images supplied from the NR unit 73, and supplies the resulting polarization images to the digital gain processing unit 75.

The digital gain processing unit 75 performs gain correction on the polarization images supplied from the shading correction unit 74, and supplies to the OPD acquisition unit 76 and the WB adjustment unit 24 the polarization images on which the gain correction has been performed. The digital gain processing unit 75 performs the gain correction to acquire images corresponding to, for example, the polarization images P11 to P14 illustrated in FIG. 2.

The OPD acquisition unit 76 acquires OPDs from the polarization images supplied from the digital gain processing unit 75, that is, generates images (hereinafter also referred to as OPD images) with a lower resolution than the polarization images, and supplies the resulting OPD images to the specular reflection region extraction unit 22.

For example, when acquiring an OPD, the OPD acquisition unit 76 divides the polarization image into 16×12-blocks (detection frames), calculates an integrated value (integral value) of the pixel values of pixels of the same color component in each block, and sets the resulting integrated value as the pixel value of a pixel of an OPD image corresponding to that block.

Accordingly, the OPD image is an image having the pixel value of each color component of R, G, and B of 16 pixels×12 pixels (16×12 resolution) and having a lower resolution than the polarization image.

The OPD acquisition unit 76 acquires OPD images corresponding to the respective polarization images P11 to P14 illustrated in FIG. 2, for example, and supplies the OPD images to the detection unit 31 and the extraction unit 32 of the specular reflection region extraction unit 22.

To the specular reflection region extraction unit 22, input information is supplied from the outside indicating, for example, the correspondence between the polarization direction of the polarized-light source and the polarization direction of each polarization image.

The specular reflection region extraction unit 22 performs the same processing as steps S12 and S13 in FIG. 5 based on the OPD images supplied from the OPD acquisition unit 76 and input information supplied from the outside, and supplies the resulting specular reflection region image to the gain calculation unit 23.

This specular reflection region image is a single image having the pixel values of R, G, and B color components of 16 pixels×12 pixels (16×12 resolution), obtained by convolving a mask image with a difference image obtained by calculating a difference between an OPD image corresponding to a 45-degree polarization image and an OPD image corresponding to a 90-degree polarization image, for example.

The gain calculation unit 23 calculates a WB gain by performing the same processing as step S14 and step S15 in FIG. 5 based on the specular reflection region image supplied from the specular reflection region extraction unit 22, and supplies the WB gain to the WB adjustment unit 24.

The WB adjustment unit 24 performs WB adjustment on each of the one or more polarization images supplied from the digital gain processing unit 75 based on the WB gain supplied from the gain calculation unit 23, and supplies to the demosaic unit 77 the polarization images on which the WB adjustment has been performed. The WB adjustment unit 24 performs the same processing as step S16 in FIG. 5.

The demosaic unit 77 performs demosaic processing on each of the one or more polarization images supplied from the WB adjustment unit 24, and supplies to the gamma correction unit 78 polarization images in which each of the resulting pixels has the value of each color component of R, G, and B as a pixel value.

The gamma correction unit 78 performs gamma correction on the polarization images supplied from the demosaic unit 77, and supplies to the color processing unit 79 the polarization images on which the gamma correction has been performed.

The color processing unit 79 performs color processing on the polarization images supplied from the gamma correction unit 78 to generate images having a target color, such as adjusting saturation, and outputs the resulting polarization images to a subsequent stage.

In the signal processing device 61 having the configuration as described above, a specular reflection region image is generated based on OPD images.

Specifically, before a specular reflection region and a non-specular reflection region (diffuse reflection region) in a polarization image are separated, these regions are mixed in a block (detection frame) for generating an OPD image.

As a result, the accuracy of detection of a specular reflection region will decrease somewhat. However, since the processing of detecting and extracting a specular reflection region is performed on an OPD image with a low resolution, the processing load for such processing can be significantly reduced.

Other Application Examples of Present Technology

Figure 10:
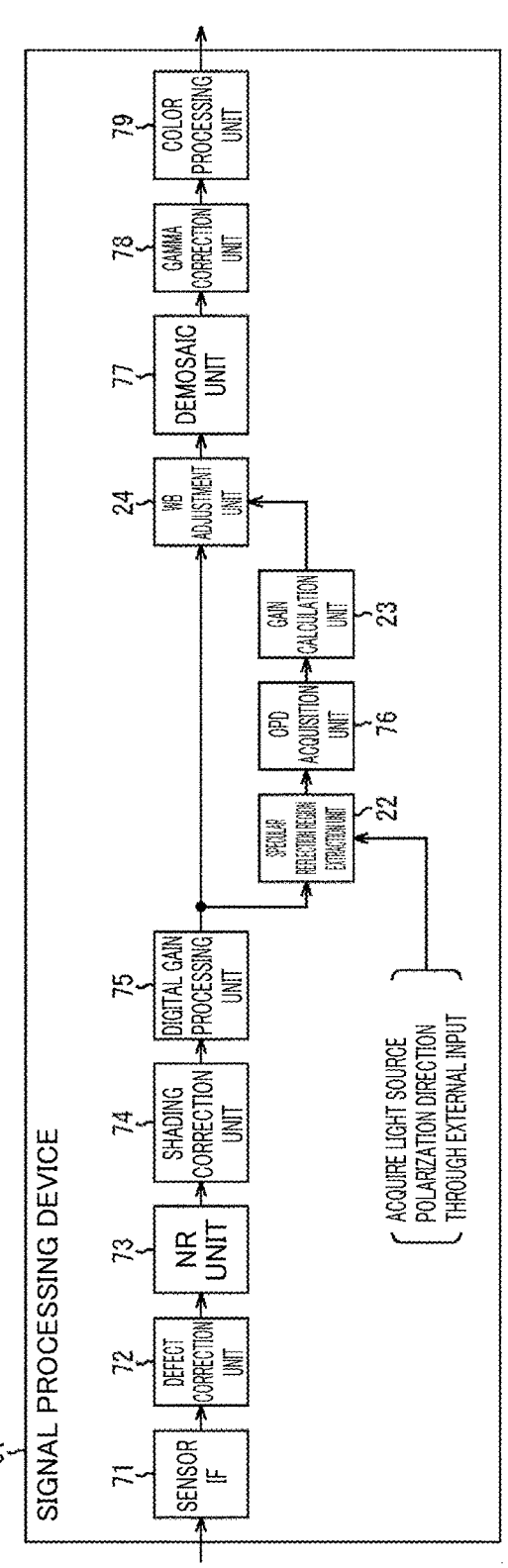
FIG. 10 is a diagram illustrating another application example of the present technology.

On the other hand, if the signal processing device 61 is configured to detect and extract a specular reflection region from the polarization images themselves, the accuracy of detection and extraction of the specular reflection region can be improved. In such a case, the signal processing device 61 is configured as illustrated in FIG. 10, for example. Note that the same reference signs will be applied to parts in FIG. 10 corresponding to those in the case of FIG. 9 and description thereof will be appropriately omitted.

The signal processing device 61 illustrated in FIG. 10 also includes the sensor IF 71 to the color processing units 79, as in the case illustrated in FIG. 9.

The configuration of the signal processing device 61 illustrated in FIG. 10 differs from the configuration of the signal processing device 61 illustrated in FIG. 9 in that the specular reflection region extraction unit 22 is provided at the previous stage to the OPD acquisition unit 76, and the other components have the same configuration as the signal processing device 61 illustrated in FIG. 9.

Therefore, in the example illustrated in FIG. 10, the polarization images output from the digital gain processing unit 75 are supplied to the specular reflection region extraction unit 22 and the WB adjustment unit 24.

Accordingly, the specular reflection region extraction unit 22 performs the same processing as step S12 and step S13 in FIG. 5 based on the polarization images supplied from the digital gain processing unit 75 and the input information supplied from the outside, and supplies the resulting specular reflection region image to the OPD acquisition unit 76.

The OPD acquisition unit 76 generates an OPD image based on the specular reflection region image supplied from the specular reflection region extraction unit 22, and supplies the OPD image to the gain calculation unit 23.

In this case, similarly to the example in FIG. 9, the specular reflection region image is divided into 16×12-blocks (detection frames), and an integrated value of the pixel values of pixels of the same color component in the block is calculated, and the resulting integrated value is set as the pixel value of a pixel of an OPD image corresponding to that block.

Therefore, the OPD image supplied from the OPD acquisition unit 76 to the gain calculation unit 23 is a specular reflection region image with a low resolution of 16×12.

The gain calculation unit 23 calculates a WB gain by performing the same processing as step S14 and step S15 in FIG. 5 based on the OPD image supplied from the OPD acquisition unit 76, and supplies the WB gain to the WB adjustment unit 24.

In the signal processing device 61 having the configuration as described above, the detection and extraction of a specular reflection region is performed based on the original polarization images, that is, the images with a high resolution, and the resulting specular reflection region image is converted into an OPD image with a low resolution. Then, a white reference is acquired from the OPD image, and a WB gain is calculated.

Therefore, in the example of FIG. 10, compared to the example of FIG. 9, a specular reflection region is detected and extracted with a high resolution, so that while the overall processing load increases, the accuracy of detection and extraction of the specular reflection region can be improved.

<Configuration Example of Computer>

The above described series of processing can also be performed by hardware or software. In the case where the series of processing is executed by software, a program that configures the software is installed on a computer. Here, the computer includes, for example, a computer built in dedicated hardware, a general-purpose personal computer on which various programs are installed to be able to execute various functions, and the like.

Figure 11:
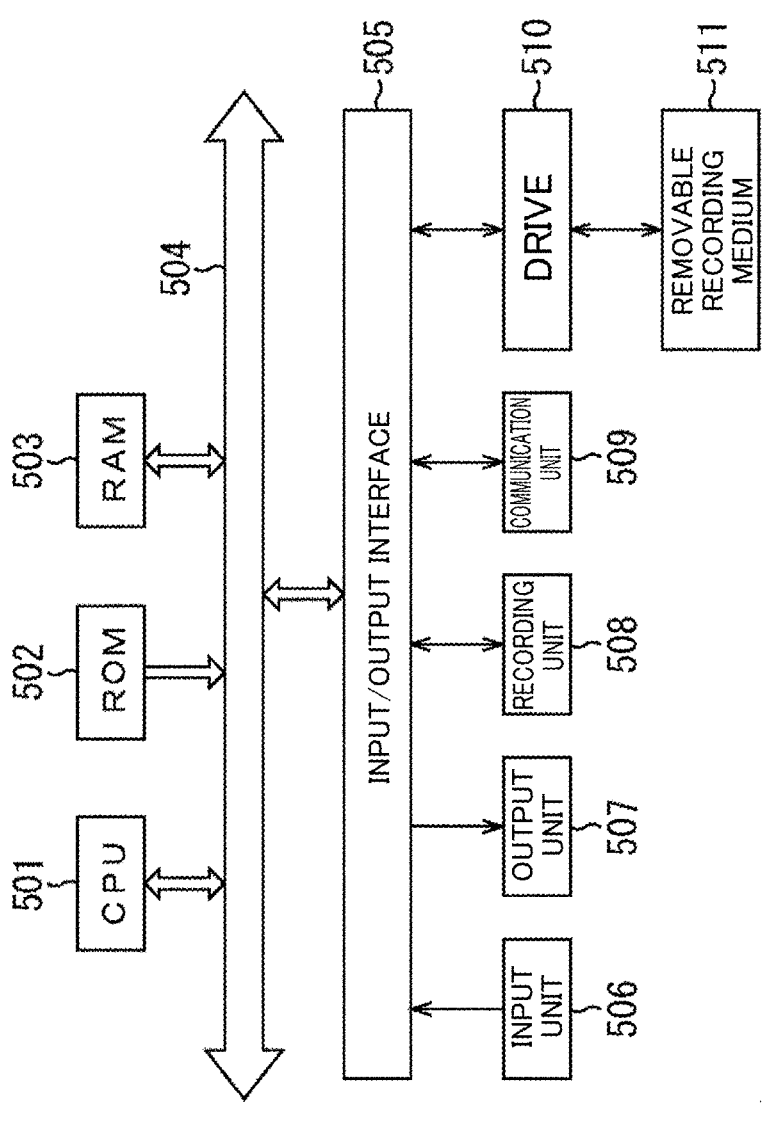

FIG. 11 is a block diagram illustrating a configuration example of computer hardware that executes the above-described series of processing using a program.

In the computer, a central processing unit (CPU) 501, a read only memory (ROM) 502, and a random access memory (RAM) 503 are connected to each other by a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, and an imaging element. The output unit 507 includes a display and a speaker. The recording unit 508 includes a hard disk and a nonvolatile memory. The communication unit 509 includes a network interface. The drive 510 drives a removable recording medium 511 such as a magnetic disk, an optical disc, a magneto optical disk, or a semiconductor memory.

In the computer having the configuration as described above, the above-described series of processing are executed by the CPU 501 loading the program recorded in the recording unit 508, for example, in the RAM 503 via the input/output interface 505 and the bus 504 and executing the program.

The program executed by the computer (the CPU 501) can be recorded and provided in, for example, the removable recording medium 511 serving as a package medium for supply. The program can be provided via a wired or wireless transfer medium such as a local region network, the Internet, or digital satellite broadcasting.

In the computer, the program can be installed on the recording unit 508 through the input/output interface 505 by loading the removable recording medium 511 into the drive 510. Furthermore, the program can be received by the communication unit 509 through a wired or wireless transfer medium and installed on the recording unit 508. Alternatively, the program can be installed in advance in the ROM 502 or the recording unit 508.

The program executed by a computer may be a program that performs processing chronologically in the order described in the present specification or may be a program that performs processing in parallel or at a necessary timing such as a called time.

Figure 12:
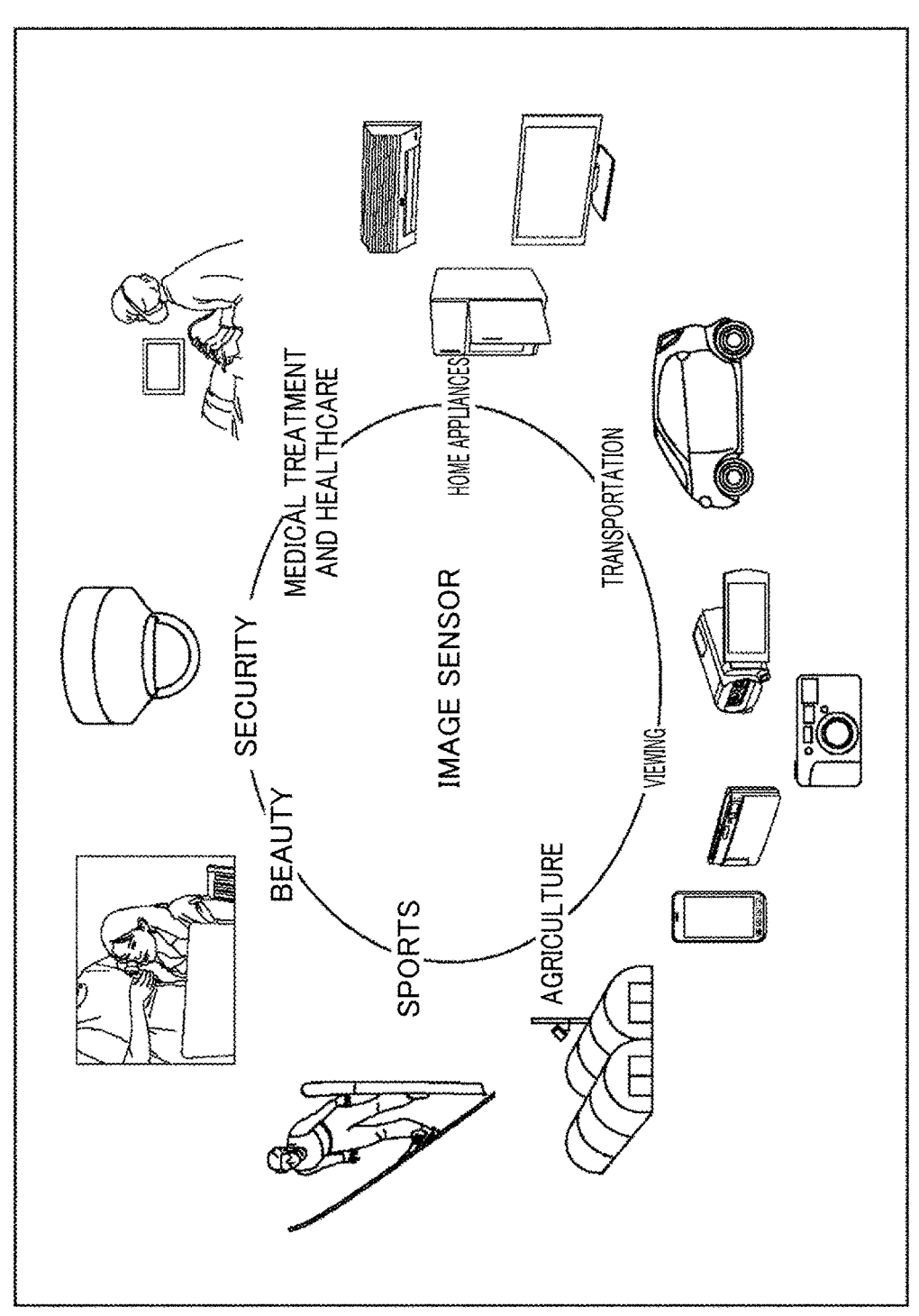
FIG. 12 is a diagram illustrating an example of use of the signal processing device.

The above-described signal processing device 11 can be used in various cases for sensing light such as visible light, infrared light, ultraviolet light, and X-rays, as illustrated in FIG. 12, for example.

Devices that capture images used for viewing, such as digital cameras and mobile devices with camera functions Devices used for transportation, such as in-vehicle sensors that capture front, rear, surrounding, and interior view images of automobiles, monitoring cameras that monitor traveling vehicles and roads, ranging sensors that measure a distance between vehicles, and the like, for safe driving such as automatic stop, recognition of a driver's condition, and the like Devices used for home appliances such as TVs, refrigerators, and air conditioners in order to capture an image of a user's gesture and perform device operations in accordance with the gesture Devices used for medical treatment and healthcare, such as endoscopes and devices that perform angiography by receiving infrared light Devices used for security, such as monitoring cameras for crime prevention and cameras for personal authentication Devices used for beauty, such as a skin measuring device that captures images of the skin and a microscope that captures images of the scalp Devices used for sports, such as action cameras and wearable cameras for sports applications Devices used for agriculture, such as cameras for monitoring conditions of fields and crops

[Example of Application to Moving Body]

The technology of the present disclosure (the present technology) can be applied to various products. For example, the technology according to the present disclosure may be realized as a device equipped in any type of moving body such as an automobile, an electric vehicle, a hybrid electric vehicle, a motorcycle, a bicycle, a personal mobility device, an airplane, a drone, a ship, and a robot.

Figure 13:
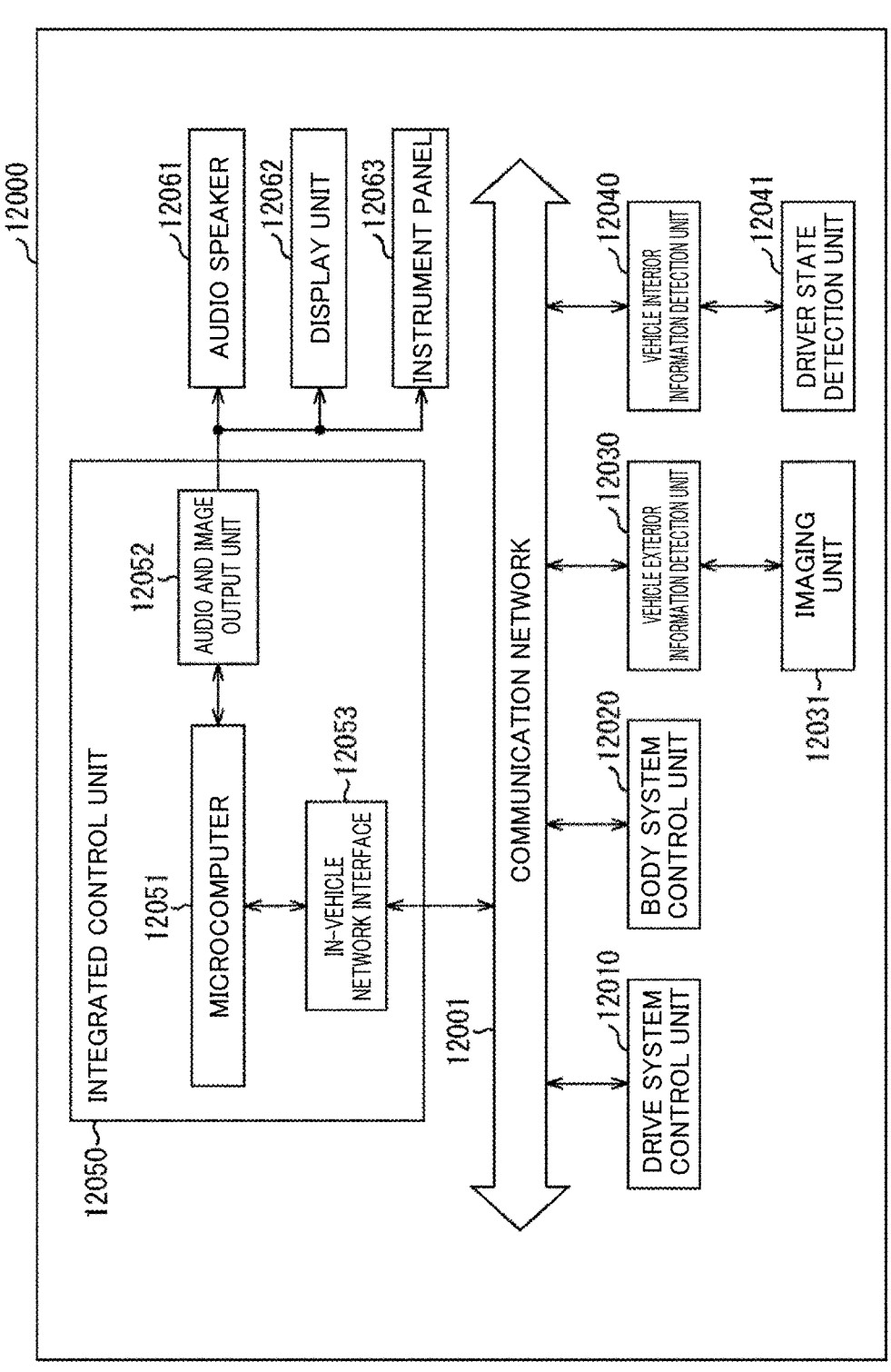
FIG. 13 is a block diagram illustrating an example of a schematic configuration of a vehicle control system.

FIG. 13 is a block diagram illustrating a schematic configuration example of a vehicle control system, which is an example of a moving body control system to which the technology according to the present disclosure can be applied.

The vehicle control system 12000 includes a plurality of electronic control units connected thereto via a communication network 12001. In the example illustrated in FIG. 13, the vehicle control system 12000 includes a drive system control unit 12010, a body system control unit 12020, a vehicle exterior information detection unit 12030, a vehicle interior information detection unit 12040, and an integrated control unit 12050. In addition, as a functional configuration of the integrated control unit 12050, a microcomputer 12051, an audio and image output unit 12052, and an in-vehicle network interface (I/F) 12053 are illustrated.

The drive system control unit 12010 controls the operation of devices related to the drive system of a vehicle according to various programs. For example, the drive system control unit 12010 functions as a control device for a driving force generation device for generating the driving force of the vehicle such as an internal combustion engine or a drive motor, a driving force transmission mechanism for transmitting the driving force to the wheels, a steering mechanism for adjusting the steering angle of the vehicle, a braking device for generating the braking force of the vehicle, or the like.

The body system control unit 12020 controls operations of various devices mounted in the vehicle body according to various programs. For example, the body system control unit 12020 functions as a control device of a keyless entry system, a smart key system, a power window device, or various lamps such as a headlamp, a back lamp, a brake lamp, a turn signal, and a fog lamp. In this case, radio waves transmitted from a portable device that substitutes for a key or signals of various switches may be input to the body system control unit 12020. The body system control unit 12020 receives inputs of the radio waves or signals and controls a door lock device, a power window device, and a lamp of the vehicle.

The vehicle exterior information detection unit 12030 detects information on the outside of the vehicle having the vehicle control system 12000 mounted thereon. For example, an imaging unit 12031 is connected to the vehicle exterior information detection unit 12030. The vehicle exterior information detection unit 12030 causes the imaging unit 12031 to capture an image outside of the vehicle and receives the captured image. The vehicle exterior information detection unit 12030 may perform object detection processing or distance detection processing for peoples, cars, obstacles, signs, and letters on the road on the basis of the received image.

The imaging unit 12031 is an optical sensor that receives light and outputs an electrical signal according to the amount of the received light. The imaging unit 12031 can also output the electrical signal as an image or distance measurement information. In addition, the light received by the imaging unit 12031 may be visible light or invisible light such as infrared light.

The vehicle interior information detection unit 12040 detects information on the inside of the vehicle. For example, a driver state detection unit 12041 that, detects a driver's state is connected to the vehicle interior information detection unit 12040. The driver state detection unit 12041 includes, for example, a camera that captures an image of the driver, and the vehicle interior information detection unit 12040 may calculate a degree of fatigue or concentration of the driver or may determine whether or not the driver is dozing on the basis of detection information input from the driver state detection unit 12041.

The microcomputer 12051 can calculate a control target value of the driving force generation device, the steering mechanism, or the braking device on the basis of the information on the outside or the inside of the vehicle acquired by the vehicle exterior information detection unit 12030 or the vehicle interior information detection unit 12040 and output a control command to the drive system control unit 12010. For example, the microcomputer 12051 can perform cooperative control for the purpose of realizing functions of an advanced driver assistance system (ADAS) including collision avoidance or impact mitigation of a vehicle, following traveling based on inter-vehicle distance, vehicle speed maintenance driving, vehicle collision warning, vehicle lane deviation warning, or the like.

Further, the microcomputer 12051 can perform cooperative control for the purpose of automated driving or the like in which autonomous travel is performed without depending on operations of the driver, by controlling the driving force generation device, the steering mechanism, or the braking device and the like on the basis of information about the surroundings of the vehicle, the information being acquired by the vehicle exterior information detection unit 12030 or the vehicle interior information detection unit 12040.

In addition, the microcomputer 12051 can output a control command to the body system control unit 12020 based on the information acquired by the vehicle exterior information detection unit 12030 outside of the vehicle. For example, the microcomputer 12051 can perform cooperative control for the purpose of preventing glare, such as switching from a high beam to a low beam, by controlling the headlamp according to the position of a preceding vehicle or an oncoming vehicle detected by the vehicle exterior information detection unit 12030.

The audio and image output unit 12052 transmits an output signal of at least one of an audio and an image to an output device capable of notifying an occupant of the vehicle or the outside of the vehicle of information visually or audibly. In the example of FIG. 13, an audio speaker 12061, a display unit 12062, and an instrument panel 12063 are illustrated as examples of the output device. The display unit 12062 may include at least one of an on-board display and a head-up display, for example.

Figure 14:
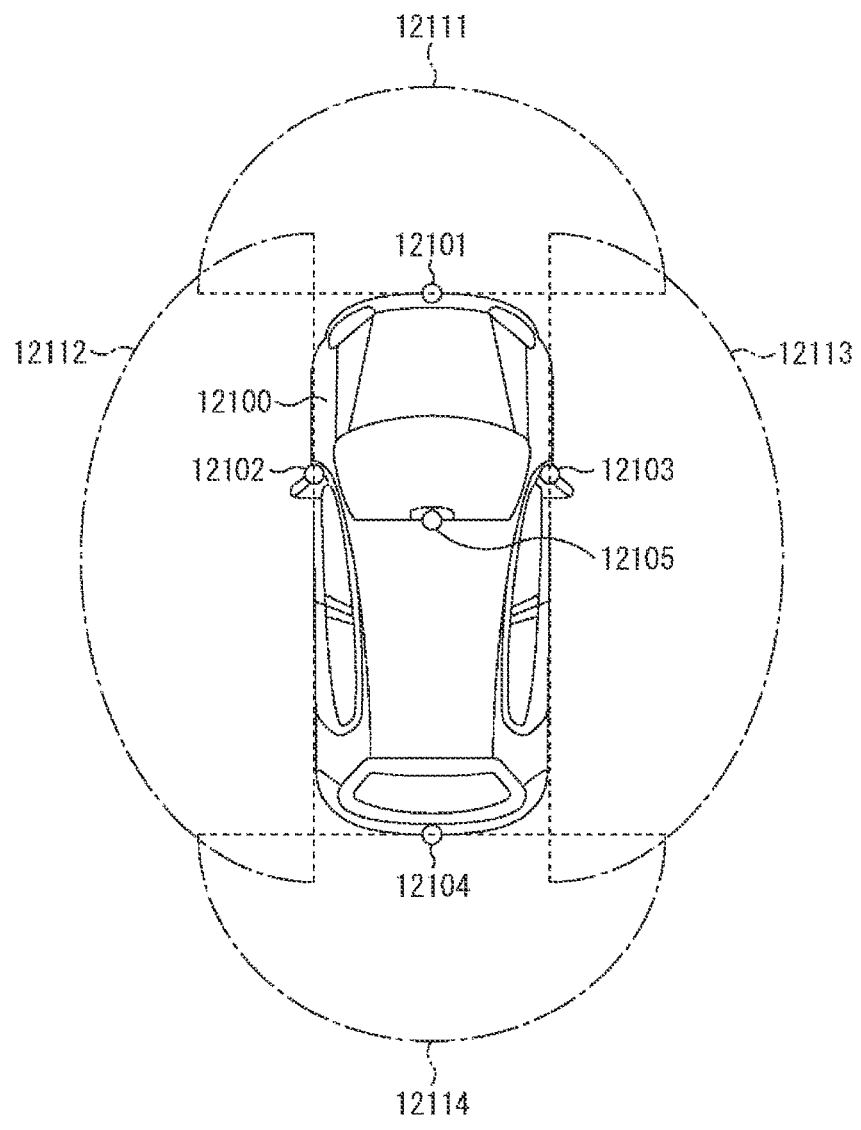
FIG. 14 is an explanatory diagram illustrating an example of positions at which vehicle exterior information detection units and imaging units are installed.

FIG. 14 is a diagram illustrating an example of installation positions of imaging units 12031.

In FIG. 14, a vehicle 12100 includes imaging units 12101, 12102, 12103, 12104, and 12105 as the imaging units 12031.

The imaging units 12101, 12102, 12103, 12104, and 12105 are provided, for example, at positions such as a front nose, side mirrors, a rear bumper, a back door, and an upper part of a windshield in the occupant compartment of the vehicle 12100. The imaging unit 12101 provided on the front nose and the imaging unit 12105 provided on the upper part of the windshield in the occupant compartment mainly acquire images in front of the vehicle 12100. The imaging units 12102 and 12103 provided on the side mirrors mainly acquire images on the sides of the vehicle 12100. The imaging unit 12104 provided on the rear bumper or the back door mainly acquires images of a side behind the vehicle 12100. The images of a front side which are acquired by the imaging units 12101 and 12105 are mainly used for detection of preceding vehicles, pedestrians, obstacles, traffic signals, traffic signs, lanes, and the like.

FIG. 14 illustrates an example of imaging ranges of the imaging units 12101 to 12104. An imaging range 12111 indicates an imaging range of the imaging unit 12101 provided at the front nose, imaging ranges 12112 and 12113 indicate the imaging ranges of the imaging units 12102 and 12103 provided at the side-view mirrors, respectively, and an imaging range 12114 indicates the imaging range of the imaging unit 12104 provided at the rear bumper or the back door. For example, a bird's-eye view image of the vehicle 12100 as viewed from above can be obtained by superimposing pieces of image data captured by the imaging units 12101 to 12104.

At least one of the imaging units 12101 to 12104 may have a function for obtaining distance information. For example, at least one of the imaging units 12101 to 12104 may be a stereo camera constituted by a plurality of imaging elements or may be an imaging element that has pixels for phase difference detection.

For example, the microcomputer 12051 can extract, particularly, a closest three-dimensional object on a path along which the vehicle 12100 is traveling, which is a three-dimensional object traveling at a predetermined speed (for example, 0 km/h or higher) in the substantially same direction as the vehicle 12100, as a preceding vehicle by acquiring a distance to each of three-dimensional objects in the imaging ranges 12111 to 12114 and temporal change in the distance (a relative speed with respect to the vehicle 12100) on the basis of the distance information obtained from the imaging units 12101 to 12104. Further, the microcomputer 12051 can set an inter-vehicle distance which should be secured in front of the vehicle in advance with respect to the preceding vehicle and can perform automated brake control (also including following stop control) or automated acceleration control (also including following start control). In this way, it is possible to perform cooperative control for the purpose of automated driving or the like in which a vehicle autonomously travels without depending on operations of the driver.

For example, the microcomputer 12051 can classify and extract three-dimensional data regarding three-dimensional objects into two-wheeled vehicles, normal vehicles, large vehicles, pedestrians, and other three-dimensional objects such as electric poles based on distance information obtained from the imaging units 12101 to 12104 and can use the three-dimensional data to perform automated avoidance of obstacles. For example, the microcomputer 12051 differentiates surrounding obstacles of the vehicle 12100 into obstacles which can be viewed by the driver of the vehicle 12100 and obstacles which are difficult to view. Then, the microcomputer 12051 determines a collision risk indicating the degree of risk of collision with each obstacle, and when the collision risk is equal to or higher than a set value and there is a possibility of collision, an alarm is output to the driver through the audio speaker 12061 or the display unit 12062, forced deceleration or avoidance steering is performed through the drive system control unit 12010, and thus it is possible to perform driving support for collision avoidance.

At least one of the imaging units 12101 to 12104 may be an infrared camera that detects infrared rays. For example, the microcomputer 12051 can recognize a pedestrian by determining whether there is a pedestrian in the captured image of the imaging units 12101 to 12104. Such pedestrian recognition is performed by, for example, a procedure in which feature points in the captured images of the imaging units 12101 to 12104 as infrared cameras are extracted and a procedure in which pattern matching processing is performed on a series of feature points indicating an outline of an object to determine whether or not the object is a pedestrian. When the microcomputer 12051 determines that there is a pedestrian in the captured images of the imaging units 12101 to 12104 and the pedestrian is recognized, the audio and image output unit 12052 controls the display unit 12062 so that a square contour line for emphasis is superimposed and displayed with the recognized pedestrian. In addition, the audio and image output unit 12052 may control the display unit 12062 so that an icon indicating a pedestrian or the like is displayed at a desired position.

An example of the vehicle control system to which the technology according to the present disclosure can be applied has been described above. The technology according to the present disclosure can be applied to the imaging unit 12031 and the vehicle exterior information detection unit 12030 among the above-described components. Specifically, for example, the signal processing device 11 illustrated in FIG. 1 can be used as the imaging unit 12031 and the vehicle exterior information detection unit 12030, so that appropriate WB adjustment can be performed without blocked-up shadows occurring.

Embodiments of the present technology are not limited to the above-described embodiment and various modifications can be made without departing from the scope and spirit of the present technology.

For example, the present technology may be configured as cloud computing in which a plurality of devices share and cooperatively process one function via a network.

In addition, each step described in the above flowchart can be executed by one device or executed in a shared manner by a plurality of devices.

Furthermore, in a case where a plurality of kinds of processing are included in a single step, the plurality of kinds of processing included in the single step may be executed by one device or by a plurality of devices in a shared manner.

The present technology can also be configured as follows.

(1)

A signal processing device including:

a detection unit that detects, based on a first polarization image of a plurality of polarization images with mutually different polarization directions, a specular reflection region in the polarization image, each of the polarization images being a captured image of a same subject; and a white reference acquisition unit that acquires, based on a result of detecting the specular reflection region, a white reference for balance adjustment from the specular reflection region of a second polarization image of the plurality of polarization images, the second polarization image having fewer specular reflection components than the first polarization image.

(2)

The signal processing device according to (1), further including an extraction unit that extracts the specular reflection region from the second polarization image based on the result of detecting the specular reflection region, wherein the white reference acquisition unit calculates, as the white reference, an average value of pixel values of pixels in the specular reflection region extracted by the extraction unit.

(3)

The signal processing device according to (2), wherein the extraction unit generates a first difference image by calculating a difference between the second polarization image and a third polarization image, of the plurality of polarization images, having fewer specular reflection components than the second polarization image, and extracts the specular reflection region from the first difference image based on the result of detecting the specular reflection region.

(4)

The signal processing device according to any one of (1) to (3), wherein the detection unit generates a second difference image by calculating a difference between the first polarization image and a third polarization image, of the plurality of polarization images, having fewer specular reflection components than the second polarization image, and detects the specular reflection region based on the second polarization image.

(5)

The signal processing device according to (4), wherein the detection unit detects the specular reflection region by binarizing the second difference image.

(6)

The signal processing device according to any one of (1) to (3), wherein the detection unit detects the specular reflection region based on a second difference image having a highest contrast among second difference images each being a difference between two polarization images obtained for each combination of two of the plurality of polarization images.

(7)

The signal processing device according to any one of (1) to (6), wherein the white reference acquisition unit calculates a white balance gain based on the white reference, and the signal processing device further includes a white balance adjustment unit that performs white balance adjustment on the polarization image based on the white balance gain.

(8)

The signal processing device according to any one of (1) to (7), wherein an image acquisition unit that includes a plurality of polarization pixels with mutually different polarization directions to capture the plurality of polarization images.

(9)

The signal processing device according to any one of (1) to (8), wherein the first polarization image is a polarization image having most specular reflection components among the plurality of polarization images.

(10)

The signal processing device according to any one of (1) to (8), wherein the first polarization image is a polarization image with the highest contrast among the plurality of polarization images.

(11)

The signal processing device according to any one of (1) to (8), wherein the first polarization image is a polarization image with the largest number of pixels whose pixel values are equal to or higher than a predetermined threshold among the plurality of polarization images.

(12)

A signal processing method including: by a signal processing device, detecting, based on a first polarization image of a plurality of polarization images with mutually different polarization directions, a specular reflection region in the polarization image, each of the polarization images being a captured image of a same subject; and acquiring, based on a result of detecting the specular reflection region, a white reference for balance adjustment from the specular reflection region of a second polarization image of the plurality of polarization images, the second polarization image having fewer specular reflection components than the first polarization image.

(13)

A program causing a computer to execute processing including the steps of:

detecting, based on a first polarization image of a plurality of polarization images with mutually different polarization directions, a specular reflection region in the polarization image, each of the polarization images being a captured image of a same subject; and acquiring, based on a result of detecting the specular reflection region, a white reference for balance adjustment from the specular reflection region of a second polarization image of the plurality of polarization images, the second polarization image having fewer specular reflection components than the first polarization image.

REFERENCE SIGNS LIST

11 Signal processing device
21 Image acquisition unit
22 Specular reflection region extraction unit
23 Gain calculation unit
24 WB adjustment unit
31 Detection unit
32 Extraction unit

The invention claimed is:

1. A signal processing device comprising:
a detection circuit that detects, based on a first polarization image of a plurality of polarization images with mutually different polarization directions, a specular reflection region in the first polarization image, each of the polarization images being a captured image of a same subject; and
a white reference acquisition circuit that acquires, based on a result of detecting the specular reflection region, a white reference for balance adjustment from the specular reflection region of a second polarization image of the plurality of polarization images, the second polarization image having fewer specular reflection components than the first polarization image.

2. The signal processing device according to claim 1, further comprising
an extraction circuit that extracts the specular reflection region from the second polarization image based on the result of detecting the specular reflection region, wherein
the white reference acquisition circuit calculates, as the white reference, an average value of pixel values of pixels in the specular reflection region extracted by the extraction circuit.

3. The signal processing device according to claim 2, wherein the extraction circuit generates a first difference image by calculating a difference between the second polarization image and a third polarization image, of the plurality of polarization images, having fewer specular reflection components than the second polarization image, and extracts the specular reflection region from the first difference image based on the result of detecting the specular reflection region.

4. The signal processing device according to claim 1, wherein the detection circuit generates a second difference image by calculating a difference between the first polarization image and a third polarization image, of the plurality of polarization images, having fewer specular reflection components than the second polarization image, and detects the specular reflection region based on the second polarization image.

5. The signal processing device according to claim 4, wherein the detection circuit detects the specular reflection region by binarizing the second difference image.

6. The signal processing device according to claim 1, wherein the detection circuit detects the specular reflection region based on a second difference image having a highest contrast among second difference images each being a difference between two polarization images obtained for each combination of two of the plurality of polarization images.

7. The signal processing device according to claim 1, wherein
the white reference acquisition circuit calculates a white balance gain based on the white reference, and
the signal processing device further comprises a white balance adjustment circuit that performs white balance adjustment on the polarization images based on the white balance gain.

8. The signal processing device according to claim 1, further comprising an image acquisition circuit that includes a plurality of polarization pixels with mutually different polarization directions to capture the plurality of polarization images.

9. The signal processing device according to claim 1, wherein the first polarization image is a polarization image having a largest number of specular reflection components among the plurality of polarization images.

10. The signal processing device according to claim 1, wherein the first polarization image is a polarization image with a highest contrast among the plurality of polarization images.

11. The signal processing device according to claim 1, wherein the first polarization image is a polarization image with a largest number of pixels whose pixel values are equal to or higher than a predetermined threshold among the plurality of polarization images.

12. A signal processing method comprising:
by a signal processing device, detecting, based on a first polarization image of a plurality of polarization images with mutually different polarization directions, a specular reflection region in the first polarization image, each of the polarization images being a captured image of a same subject; and
acquiring, based on a result of detecting the specular reflection region, a white reference for balance adjustment from the specular reflection region of a second polarization image of the plurality of polarization images, the second polarization image having fewer specular reflection components than the first polarization image.

13. A non-transitory computer readable medium storing a program, the program being executable by a processor to perform operations comprising:

detecting, based on a first polarization image of a plurality of polarization images with mutually different polarization directions, a specular reflection region in the first polarization image, each of the polarization images being a captured image of a same subject; and acquiring, based on a result of detecting the specular reflection region, a white reference for balance adjustment from the specular reflection region of a second polarization image of the plurality of polarization images, the second polarization image having fewer specular reflection components than the first polarization image.

14. The non-transitory computer readable medium according to claim 13, wherein the operations further comprise:

extracting the specular reflection region from the second polarization image based on the result of detecting the specular reflection region; and calculating, as the white reference, an average value of pixel values of pixels in the extracted specular reflection region.

15. The non-transitory computer readable medium according to claim 14, wherein the operations further comprise:

generating a first difference image by calculating a difference between the second polarization image and a third polarization image, of the plurality of polarization images, having fewer specular reflection components than the second polarization image, and extracting the specular reflection region from the first difference image based on the result of detecting the specular reflection region.

16. The non-transitory computer readable medium according to claim 13, wherein the operations further comprise:

generating a second difference image by calculating a difference between the first polarization image and a third polarization image, of the plurality of polarization images, having fewer specular reflection components than the second polarization image, and detecting the specular reflection region based on the second polarization image.

17. The non-transitory computer readable medium according to claim 16, wherein the operations further comprise:

detecting the specular reflection region by binarizing the second difference image.

18. The non-transitory computer readable medium according to claim 13, wherein the operations further comprise:

detecting the specular reflection region based on a second difference image having a highest contrast among second difference images each being a difference between two polarization images obtained for each combination of two of the plurality of polarization images.

19. The non-transitory computer readable medium according to claim 13, wherein the operations further comprise:

calculating a white balance gain based on the white reference; and performing white balance adjustment on the polarization images based on the white balance gain.

20. The non-transitory computer readable medium according to claim 13, wherein the first polarization image is a polarization image having a largest number of specular reflection components among the plurality of polarization images.

\*   \*   \*   \*   \*